(12) United States Patent
Kageme et al.

(10) Patent No.: US 12,117,514 B2
(45) Date of Patent: Oct. 15, 2024

(54) ANTENNA DEVICE AND RADAR DEVICE

(71) Applicant: Mitsubishi Electric Corporation, Tokyo (JP)

(72) Inventors: Satoshi Kageme, Tokyo (JP); Mitsuru Kirita, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 374 days.

(21) Appl. No.: 17/504,730

(22) Filed: Oct. 19, 2021

(65) Prior Publication Data

US 2022/0043132 A1 Feb. 10, 2022

Related U.S. Application Data

(63) Continuation of application No. PCT/JP2019/019677, filed on May 17, 2019.

(51) Int. Cl.
*G01S 13/00* (2006.01)
*G01S 7/03* (2006.01)
(Continued)

(52) U.S. Cl.
CPC .............. *G01S 13/003* (2013.01); *G01S 7/03* (2013.01); *G01S 7/352* (2013.01); *G01S 13/584* (2013.01);
(Continued)

(58) Field of Classification Search
CPC .......... G01S 13/003; G01S 7/03; G01S 7/352; G01S 13/584; G01S 13/931;
(Continued)

(56) References Cited

U.S. PATENT DOCUMENTS 6,346,923 B1 * 2/2002 Johnson ................. H01Q 25/02
343/853
7,394,400 B2 * 7/2008 Tauchi ................... G08G 1/161
701/1

(Continued)

FOREIGN PATENT DOCUMENTS

CN 106019238 A 10/2016
JP 2009-47510 A 3/2009
(Continued)

OTHER PUBLICATIONS

Japanese Office Action dated Sep. 7, 2021 in Japanese Patent Application No. 2021-520496.
(Continued)

*Primary Examiner* — Timothy A Brainard
*Assistant Examiner* — Ismaaeel A. Siddiquee
(74) *Attorney, Agent, or Firm* — Birch, Stewart, Kolasch & Birch, LLP

(57) ABSTRACT

An antenna device is formed in such a manner that reception antennas are arranged at regular intervals between two transmission antennas adjacent to each other among transmission antennas, and a spacing between the transmission antenna and the transmission antenna has a width obtained by adding an integral multiple of a spacing $d_{Rx}$ between each two of the reception antennas to a width obtained by dividing the spacing $d_{Rx}$ by the number $N_{Tx}$ of the transmission antennas.

19 Claims, 25 Drawing Sheets

(51) Int. Cl.
  *G01S 7/35* (2006.01)
  *G01S 13/58* (2006.01)
  *G01S 13/931* (2020.01)

(52) U.S. Cl.
  CPC .............. *G01S 13/931* (2013.01); *G01S 2013/93271* (2020.01); *G01S 2013/93272* (2020.01); *G01S 2013/93274* (2020.01); *G01S 2013/93275* (2020.01); *G01S 2013/93276* (2020.01)

(58) Field of Classification Search
  CPC ............ G01S 2013/93271; G01S 2013/93272; G01S 2013/93274; G01S 2013/93275; G01S 2013/93276; G01S 13/282; G01S 13/284; G01S 13/4454; G01S 13/582; H01Q 13/206; H01Q 1/1271; H01Q 1/3233; H01Q 1/3283
  See application file for complete search history.

(56) References Cited

U.S. PATENT DOCUMENTS

| | | | |
|---|---|---|---|
| 2008/0303711 A1* | 12/2008 | Matsuoka | G01S 13/345 342/196 |
| 2009/0046000 A1 | 2/2009 | Matsuoka | |
| 2015/0054678 A1* | 2/2015 | Wakayama | G01S 13/9011 342/25 A |
| 2016/0285172 A1 | 9/2016 | Kishigami et al. | |
| 2016/0356885 A1* | 12/2016 | Hakobyan | G01S 7/352 |
| 2019/0067835 A1 | 2/2019 | Kishigami et al. | |
| 2019/0302254 A1 | 10/2019 | Maruyama et al. | |
| 2020/0044361 A1 | 2/2020 | Kishigami et al. | |
| 2020/0110155 A1* | 4/2020 | Cho | G01S 7/027 |
| 2020/0251832 A1 | 8/2020 | Kishigami et al. | |
| 2022/0050176 A1* | 2/2022 | Kishigami | G01S 7/03 |
| 2023/0314555 A1 | 10/2023 | Kishigami et al. | |
| 2024/0012096 A1 | 1/2024 | Kishigami et al. | |

FOREIGN PATENT DOCUMENTS

| | | | |
|---|---|---|---|
| JP | 2012127689 A | * | 7/2012 |
| JP | 2014222168 A | * | 11/2014 |
| JP | 5693041 B2 | | 4/2015 |
| WO | WO 2018/122926 A1 | | 7/2018 |

OTHER PUBLICATIONS

Chinese Office Action and Search Report for Chinese Application No. 201980096348.6, dated Mar. 19, 2024, with English translation.

* cited by examiner

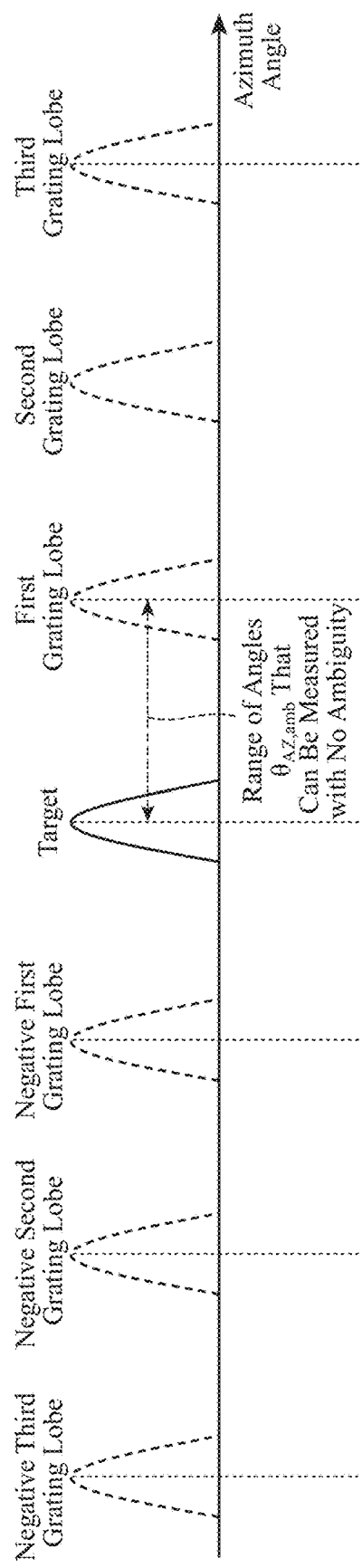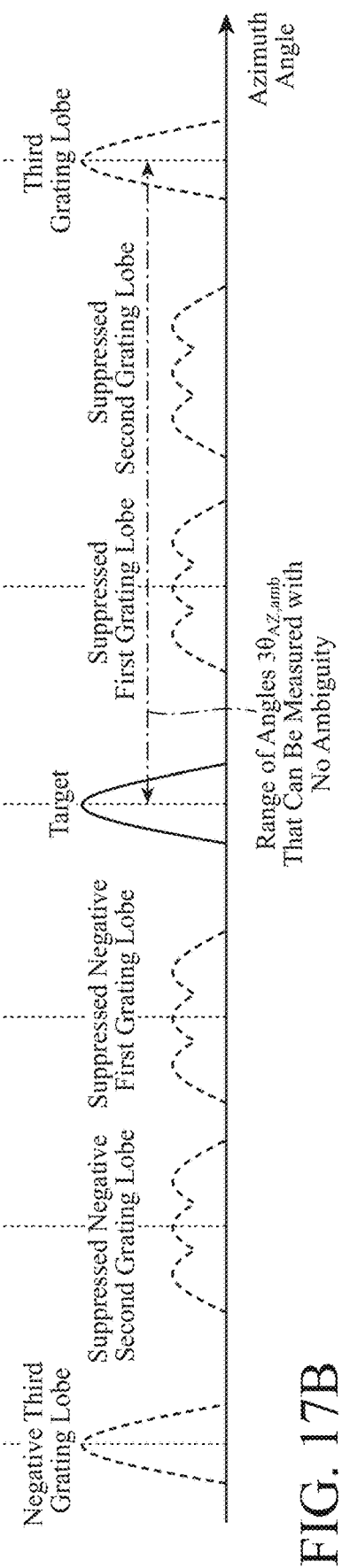
FIG. 17A
FIG. 17B

ANTENNA DEVICE AND RADAR DEVICE

CROSS REFERENCE TO RELATED APPLICATION

This application is a Continuation of PCT International Application No. PCT/JP2019/019677, filed on May 17, 2019, which is hereby expressly incorporated by reference into the present application.

TECHNICAL FIELD

The invention relates to an antenna device and a radar device that include a plurality of transmission antennas and a plurality of reception antennas.

BACKGROUND ART

In order to prevent collision of an automobile with a target, a radar device having a function of detecting the target may be installed on the automobile.

The following Patent Literature 1 discloses a radar device including a transmission antenna and a reception antenna, in which a plurality of element antennas included in each of the transmission antenna and the reception antenna are arranged in a distributed manner.

The radar device disclosed in Patent Literature 1 uses the plurality of element antennas included in the reception antenna, as a reception array antenna that actually exists (hereinafter, referred to as an "actual array antenna"), and also uses a reception array antenna that is formed in a virtual manner (hereinafter, referred to as a "virtual array antenna").

Thus, the radar device disclosed in Patent Literature 1 can detect a target using reception signals of the actual array antenna and reception signals of the virtual array antenna.

CITATION LIST

Patent Literatures

Patent Literature 1: WO 2018/122926 A

SUMMARY OF INVENTION

Technical Problem

The radar device disclosed in Patent Literature 1 has a problem that when signal processing for detecting a target is performed using reception signals of the actual array antenna and reception signals of the virtual array antenna, grating lobes may occur in a signal being subjected to the signal processing.

The invention is made to solve a problem such as that described above, and an object of the invention is to obtain an antenna device and a radar device that can suppress occurrence of grating lobes.

Solution to Problem

An antenna device according to the invention includes a plurality of transmission antennas to radiate transmission signals; and a plurality of reception antennas each to receive, as a reflected signal, each of the transmission signals radiated from the respective plurality of transmission antennas and then reflected by a target, and output a reception signal corresponding to the reflected signals, wherein the plurality of reception antennas are arranged at regular intervals between two transmission antennas adjacent to each other among the plurality of transmission antennas, and a spacing between the two transmission antennas has a width obtained by adding an integral multiple of a spacing between each two of the plurality of reception antennas to a width obtained by dividing the spacing between each two of the plurality of reception antennas by a number of the plurality of transmission antennas.

Advantageous Effects of Invention

According to the invention, an antenna device is formed in such a manner that a plurality of reception antennas are arranged at regular intervals between two transmission antennas adjacent to each other among a plurality of transmission antennas, and a spacing between the two transmission antennas has a width obtained by adding an integral multiple of a spacing between each two of the plurality of reception antennas to a width obtained by dividing the spacing between each two of the plurality of reception antennas by the number of the plurality of transmission antennas. Thus, the antenna device according to the invention can suppress occurrence of grating lobes.

BRIEF DESCRIPTION OF DRAWINGS

FIG. 4 is a hardware configuration diagram of a computer at a time when the signal processor 13 is implemented by software, firmware, or the like.

FIG. 17A is an explanatory diagram showing a coherent-integration signal obtained when virtual array antennas are formed when the transmission antennas 24-1 to 24-3 are arranged in an antenna arrangement shown in FIG. 18, and FIG. 17B is an explanatory diagram showing a coherent-integration signal obtained when virtual array antennas are formed in the antenna arrangement shown in FIG. 15.

DESCRIPTION OF EMBODIMENTS

To describe the invention in more detail, embodiments for carrying out the invention will be described below in accordance with the accompanying drawings.

First Embodiment

Figure 1:
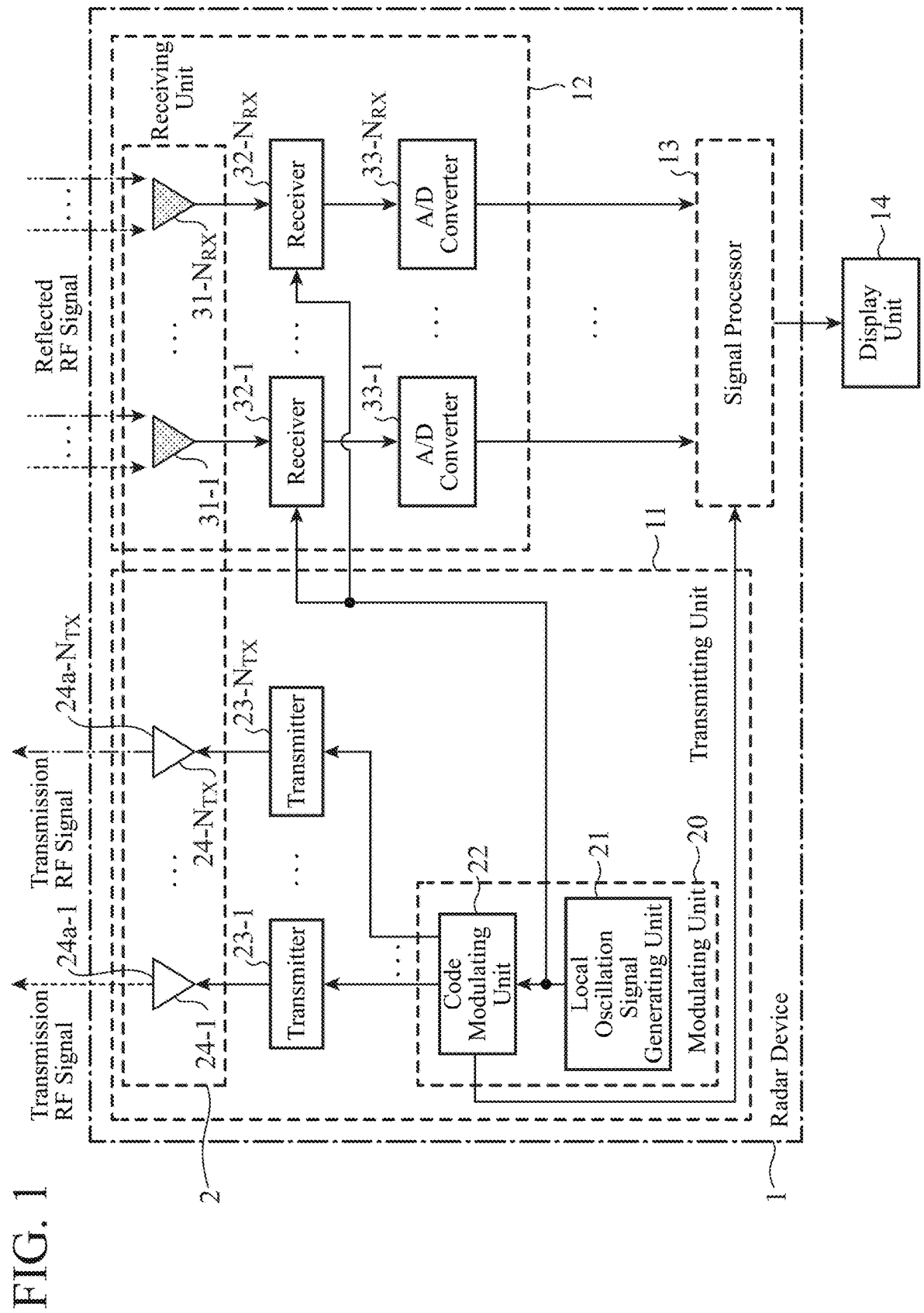
FIG. 1 is a configuration diagram showing a radar device 1 according to a first embodiment.

FIG. 1 is a configuration diagram showing a radar device 1 according to a first embodiment.

Figure 2:
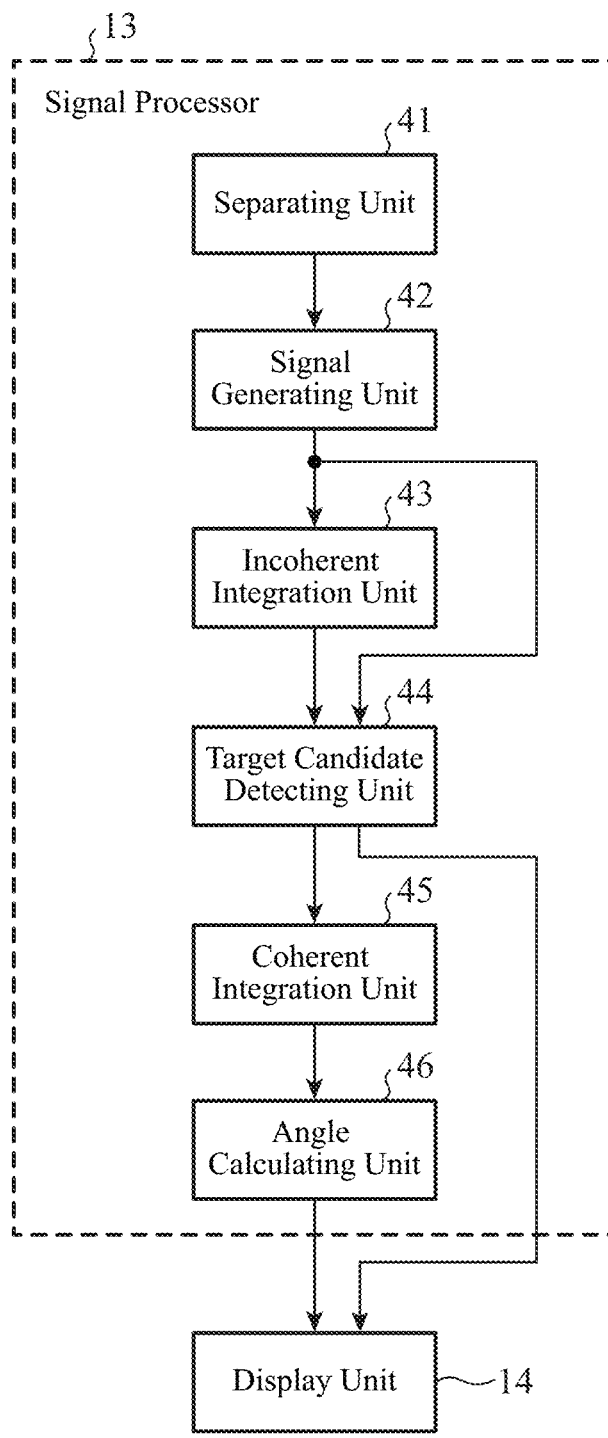
FIG. 2 is a configuration diagram showing a signal processor 13 in the radar device 1 according to the first embodiment.

FIG. 2 is a configuration diagram showing a signal processor 13 in the radar device 1 according to the first embodiment.

Figure 3:
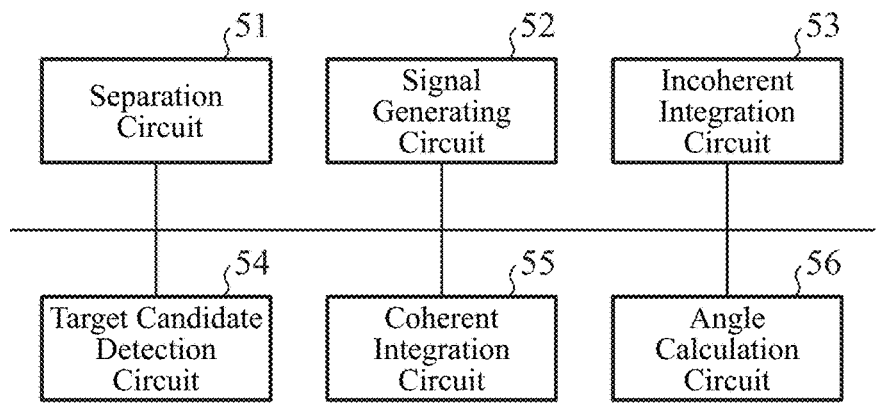
FIG. 3 is a hardware configuration diagram showing hardware of the signal processor 13.

FIG. 3 is a hardware configuration diagram showing hardware of the signal processor 13.

In FIG. 1, the radar device 1 includes a transmitting unit 11, a receiving unit 12, and the signal processor 13.

An antenna device 2 includes transmission antennas 24-1 to 24-$N_{Tx}$ and reception antennas 31-1 to 31-$N_{Rx}$, and is included in the radar device 1. $N_{Tx}$ is an integer greater than or equal to 2 and $N_{Rx}$ is an integer greater than or equal to 2.

The transmitting unit 11 includes a modulating unit 20, transmitters 23-1 to 23-$N_{Tx}$, and the transmission antennas 24-1 to 24-$N_{Tx}$.

The modulating unit 20 includes a local oscillation signal generating unit 21 and a code modulating unit 22.

The local oscillation signal generating unit 21 generates a local oscillation signal and outputs the local oscillation signal to each of the code modulating unit 22 and receivers 32-1 to 32-$N_{Rx}$.

The code modulating unit 22 modulates each local oscillation signal outputted from the local oscillation signal generating unit 21, using a modulation code which is codes corresponding to the transmission channel number of each of the transmission antennas 24-1 to 24-$N_{Tx}$, thereby generating $N_{Tx}$ transmission radio frequency (RF) signals as $N_{Tx}$ transmission signals.

The code modulating unit 22 outputs the $N_{Tx}$ transmission RF signals to the corresponding transmitters 23-1 to 23-$N_{Tx}$, and outputs the modulation codes corresponding to the respective transmission channel numbers to the signal processor 13.

A transmitter 23-$n_{Tx}$ ($n_{Tx}=1, \ldots, N_{Tx}$) outputs the transmission RF signal outputted from the code modulating unit 22 to a transmission antenna 24-$n_{Tx}$.

The transmission antenna 24-$n_{Tx}$ has a radiation surface 24a-$n_{Tx}$.

The transmission antenna 24-$n_{Tx}$ radiates the transmission RF signal from the radiation surface 24a-$n_{Tx}$.

The receiving unit 12 includes the reception antennas 31-1 to 31-$N_{Rx}$, the receivers 32-1 to 32-$N_{Rx}$, and analog-to-digital converters (hereinafter, referred to as "A/D converters") 33-1 to 33-$N_{Rx}$.

A reception antenna 31-$n_{Rx}$ ($n_{Rx}=1, \ldots, N_{Rx}$) receives, as a reflected RF signal (reflected signal), each of the transmission RF signals that are radiated from the respective transmission antennas 24-1 to 24-$N_{Tx}$ and then reflected by a target.

The reception antenna 31-$n_{Rx}$ outputs the reflected RF signals as a reception RF signal (reception signal) to a receiver 32-$n_{Rx}$.

The receiver 32-$n_{Rx}$ down-converts the frequency of the reception RF signal outputted from the reception antenna 31-$n_{Rx}$, using the local oscillation signal outputted from the local oscillation signal generating unit 21.

The receiver 32-$n_{Rx}$, for example, filters the down-converted reception RF signal, using a bandpass filter, thereby amplifying the strength of the signal having passed through the bandpass filter.

The receiver 32-$n_{Rx}$ detects the phase of the signal whose strength has been amplified, thereby generating a reception beat signal with a reception channel number $n_{Rx}$, and outputs the reception beat signal to an A/D converter 33-$n_{Rx}$.

The A/D converter 33-$n_{Rx}$ converts the reception beat signal outputted from the receiver 32-$n_{Rx}$ from an analog signal to a digital signal, and outputs the digital signal to the signal processor 13.

The signal processor 13 includes, as shown in FIG. 2, a separating unit 41, a signal generating unit 42, an incoherent integration unit 43, a target candidate detecting unit 44, a coherent integration unit 45, and an angle calculating unit 46.

The signal processor 13 coherently integrates the digital signals outputted from the A/D converters 33-1 to 33-$N_{Rx}$, on the basis of the arrangement of each of the transmission antennas 24-1 to 24-$N_{Tx}$ and the reception antennas 31-1 to 31-$N_{Rx}$.

The signal processor 13 measures the angle of the target from a coherent-integration signal which is a result of the coherent integration of the digital signals.

The separating unit 41 is implemented by, for example, a separation circuit 51 shown in FIG. 3.

The separating unit 41 demodulates reception beat signals corresponding to both of the transmission channel numbers and the reception channel numbers from the digital signals outputted from the A/D converters 33-1 to 33-$N_{Rx}$, using the modulation codes corresponding to the respective transmission channel numbers and outputted from the code modulating unit 22. The demodulated reception beat signals are being separated for each transmission channel and being separated for each reception channel.

The separating unit 41 outputs the demodulated reception beat signals to the signal generating unit 42.

The signal generating unit 42 is implemented by, for example, a signal generating circuit 52 shown in FIG. 3.

The signal generating unit 42 performs a discrete Fourier transform on the demodulated reception beat signals outputted from the separating unit 41, thereby generating distance and speed signals corresponding to both of the transmission channels and the reception channels.

The distance and speed signals include each of distance information about the distance to a target candidate (target) and speed information about the speed of the target candidate.

The signal generating unit 42 outputs the distance and speed signals to each of the incoherent integration unit 43 and the target candidate detecting unit 44.

The incoherent integration unit 43 is implemented by, for example, an incoherent integration circuit 53 shown in FIG. 3.

The incoherent integration unit 43 incoherently integrates the distance and speed signals outputted from the signal generating unit 42, and outputs an incoherent-integration signal which is a result of the incoherent integration of the distance and speed signals to the target candidate detecting unit 44.

The target candidate detecting unit 44 is implemented by, for example, a target candidate detection circuit 54 shown in FIG. 3.

The target candidate detecting unit 44 detects a target candidate on the basis of the signal strength of the incoherent-integration signal outputted from the incoherent integration unit 43.

The target candidate detecting unit 44 calculates each of the distance to the detected target candidate and the speed of the target candidate.

The target candidate detecting unit 44 outputs each of the distance to the target candidate and the speed of the target candidate to a display unit 14.

The target candidate detecting unit 44 outputs distance and speed signals corresponding to the target candidate that is detected on the basis of the signal strength of the incoherent-integration signal among the plurality of distance and speed signals outputted from the signal generating unit 42, to the coherent integration unit 45.

The coherent integration unit 45 is implemented by, for example, a coherent integration circuit 55 shown in FIG. 3.

The coherent integration unit 45 coherently integrates the distance and speed signals outputted from the target candidate detecting unit 44, on the basis of the arrangement of each of the transmission antennas 24-1 to 24-$N_{Tx}$ and the reception antennas 31-1 to 31-$N_{Rx}$.

The arrangement of each of the transmission antennas 24-1 to 24-$N_{Tx}$ and the reception antennas 31-1 to 31-$N_{Rx}$ may be stored in an internal memory of the coherent integration unit 45 or may be provided from a source external to the radar device 1.

The coherent integration unit 45 outputs a coherent-integration signal which is a result of the coherent integration of the distance and speed signals, to the angle calculating unit 46.

The angle calculating unit 46 is implemented by, for example, an angle calculation circuit 56 shown in FIG. 3.

The angle calculating unit 46 calculates each of the azimuth and elevation angles of the target candidate on the basis of the signal strength of the coherent-integration signal outputted from the coherent integration unit 45.

The angle calculating unit 46 outputs each of the azimuth and elevation angles of the target candidate to the display unit 14.

The display unit 14 displays each of the distance to the target candidate and the speed of the target candidate which are outputted from the target candidate detecting unit 44 on a display, and displays each of the azimuth and elevation angles of the target candidate which are outputted from the angle calculating unit 46 on the display.

In FIG. 2, it is assumed that each of the separating unit 41, the signal generating unit 42, the incoherent integration unit 43, the target candidate detecting unit 44, the coherent integration unit 45, and the angle calculating unit 46 which are the components of the signal processor 13 is implemented by dedicated hardware such as that shown in FIG. 3. Namely, it is assumed that the signal processor 13 is implemented by the separation circuit 51, the signal generating circuit 52, the incoherent integration circuit 53, the target candidate detection circuit 54, the coherent integration circuit 55, and the angle calculation circuit 56.

Here, each of the separation circuit 51, the signal generating circuit 52, the incoherent integration circuit 53, the target candidate detection circuit 54, the coherent integration circuit 55, and the angle calculation circuit 56 corresponds, for example, to a single circuit, a composite circuit, a programmed processor, a parallel programmed processor, an application specific integrated circuit (ASIC), a field-programmable gate array (FPGA), or a combination thereof.

The components of the signal processor 13 are not limited to those implemented by dedicated hardware, and the signal processor 13 may be implemented by software, firmware, or a combination of software and firmware.

The software or firmware is stored as a program in a memory of a computer. The computer refers to hardware that executes the program, and corresponds, for example, to a central processing unit (CPU), a central processor, a processing unit, an arithmetic unit, a microprocessor, a microcomputer, a processor, or a digital signal processor (DSP).

Figure 4:
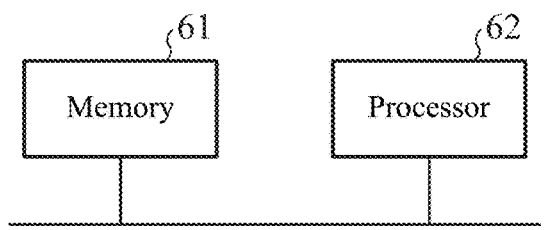

FIG. 4 is a hardware configuration diagram of a computer at a time when the signal processor 13 is implemented by software, firmware, or the like.

When the signal processor 13 is implemented by software, firmware, or the like, a program for causing a computer to perform processing procedures performed by the separating unit 41, the signal generating unit 42, the incoherent integration unit 43, the target candidate detecting unit 44, the coherent integration unit 45, and the angle calculating unit 46 is stored in a memory 61. Then, a processor 62 of the computer executes the program stored in the memory 61.

In addition, FIG. 3 shows an example in which each of the components of the signal processor 13 is implemented by dedicated hardware, and FIG. 4 shows an example in which the signal processor 13 is implemented by software, firmware, or the like. However, they are merely examples, and some of the components of the signal processor 13 may be implemented by dedicated hardware and the other components may be implemented by software, firmware, or the like.

Figure 5:
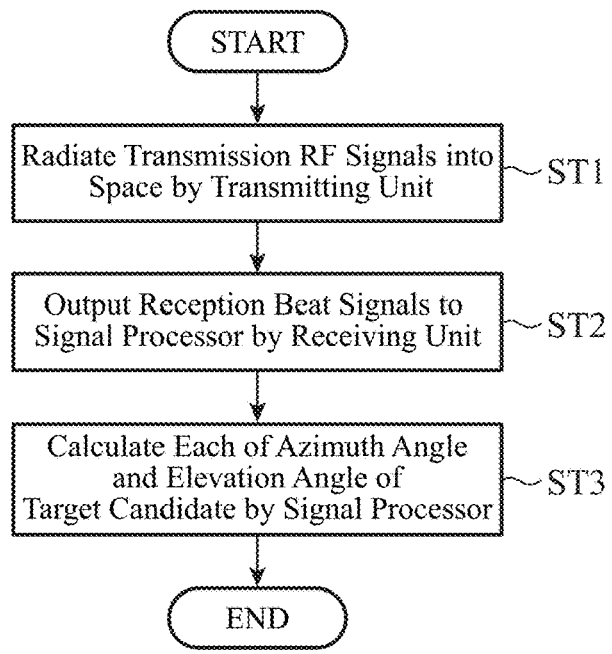
FIG. 5 is a flowchart showing a processing procedure performed by the radar device 1 shown in FIG. 1.

FIG. 5 is a flowchart showing a processing procedure performed by the radar device 1 shown in FIG. 1.

Figure 6:
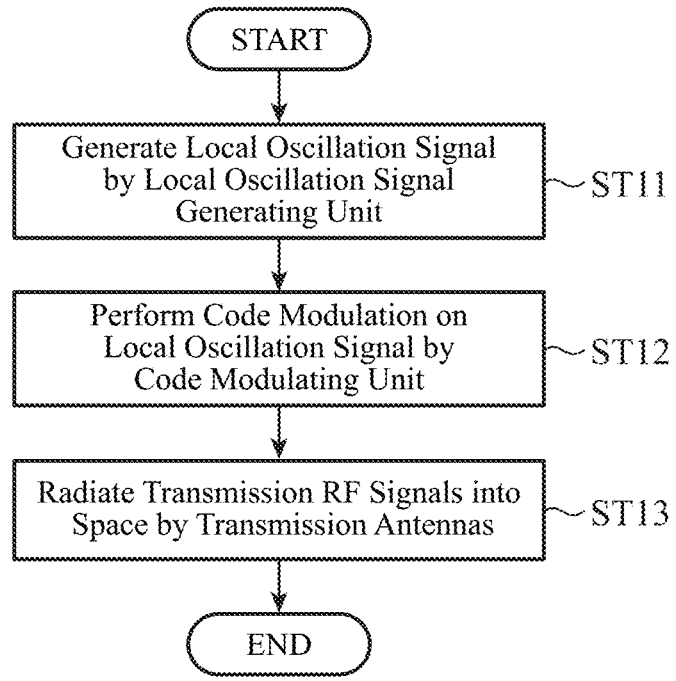
FIG. 6 is a flowchart showing a processing procedure performed by a transmitting unit 11 shown in FIG. 1.

FIG. 6 is a flowchart showing a processing procedure performed by the transmitting unit 11 shown in FIG. 1.

Figure 7:
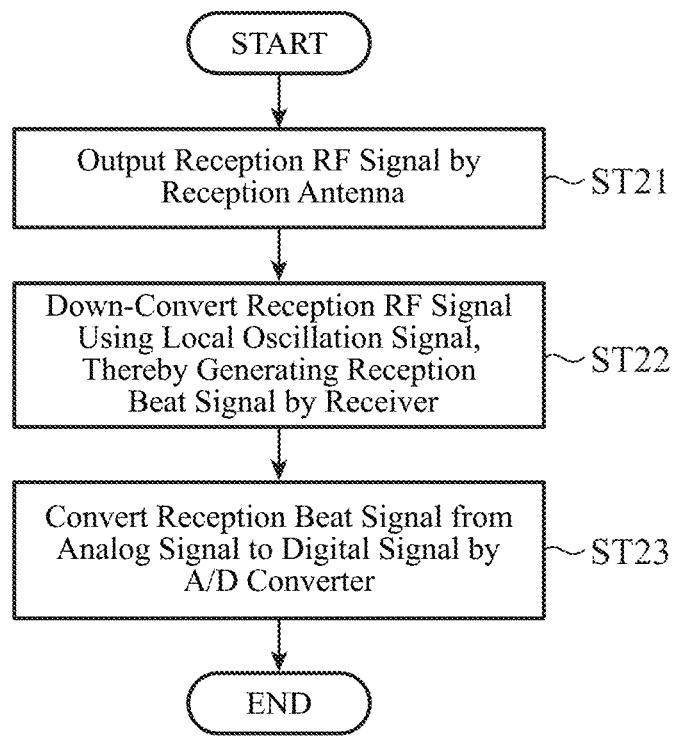
FIG. 7 is a flowchart showing a processing procedure performed by a receiving unit 12 shown in FIG. 1.

FIG. 7 is a flowchart showing a processing procedure performed by the receiving unit 12 shown in FIG. 1.

Figure 8:
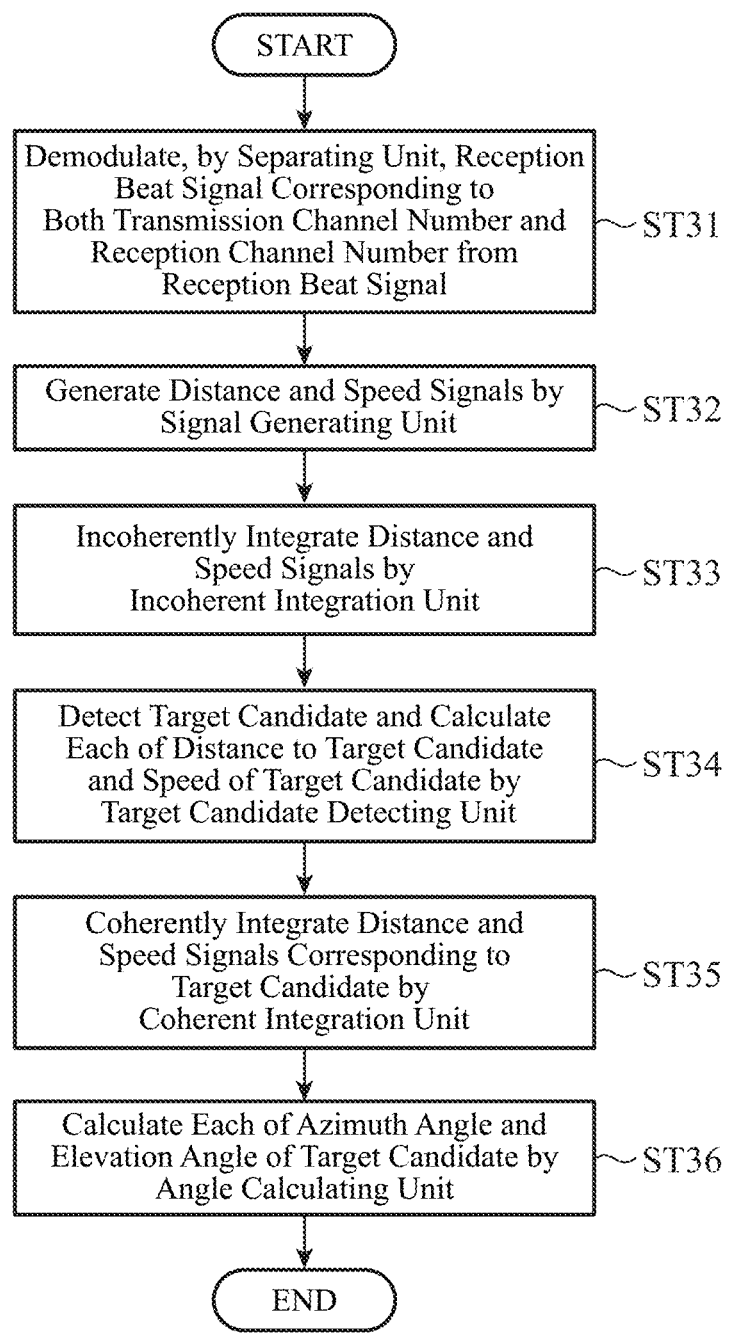
FIG. 8 is a flowchart showing a processing procedure performed by the signal processor 13 shown in FIG. 1.

FIG. 8 is a flowchart showing a processing procedure performed by the signal processor 13 shown in FIG. 1.

It is assumed that in the radar device 1 shown in FIG. 1, each of the transmission antennas 24-1 to 24-$N_{Tx}$ and the reception antennas 31-1 to 31-$N_{Rx}$ is installed on a vehicle. Note that the configuration is not limited to the one in which each of the transmission antennas 24-1 to 24-$N_{Tx}$ and the reception antennas 31-1 to 31-$N_{Rx}$ is installed on the vehicle, and each of the transmission antennas 24-1 to 24-$N_{Tx}$ and the reception antennas 31-1 to 31-$N_{Rx}$ may be installed on a structure, etc., installed on a road.

Figure 9:
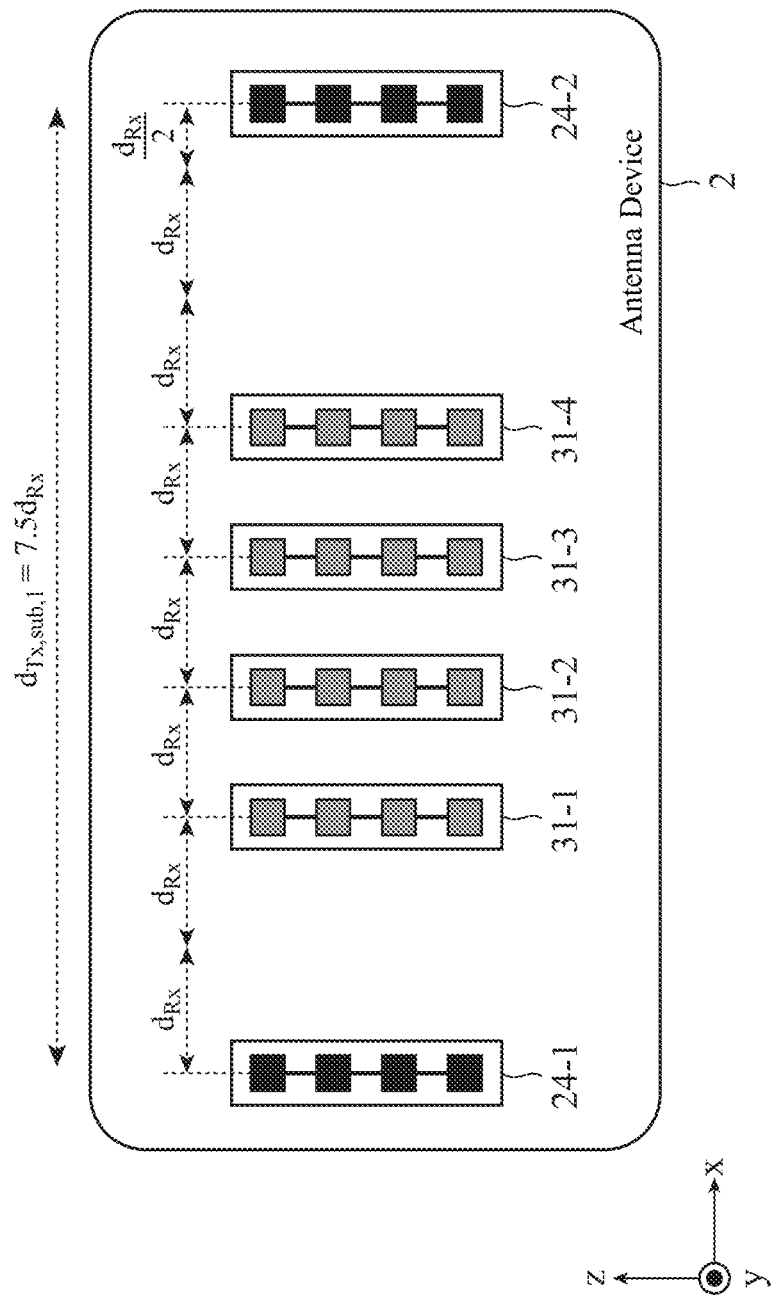
FIG. 9 is an explanatory diagram showing an exemplary arrangement of transmission antennas 24-1 to 24-2 and reception antennas 31-1 to 31-4 in an antenna device 2.

FIG. 9 is an explanatory diagram showing an exemplary arrangement of the transmission antennas 24-1 to 24-$N_{Tx}$ and the reception antennas 31-1 to 31-$N_{Rx}$ in the antenna device 2. In FIG. 9, $N_{Tx}$=2 and $N_{Rx}$=4.

Figure 26:
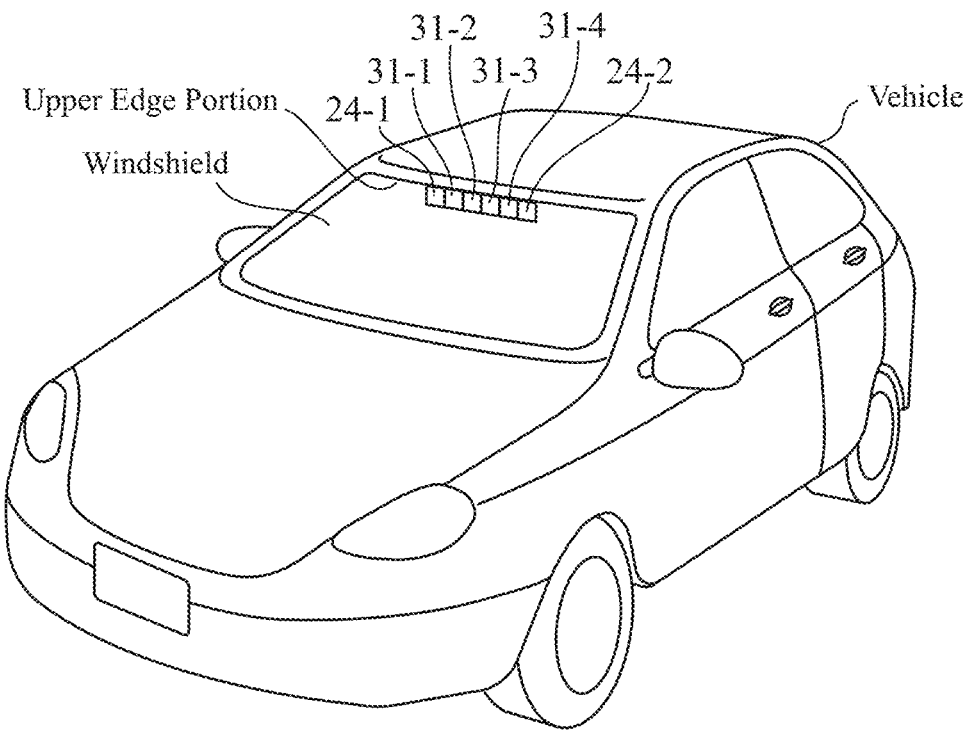
FIG. 26 is an explanatory diagram showing exemplary installation of the transmission antennas 24-1 to 24-2 and the reception antennas 31-1 to 31-4 in the antenna device 2.

Transmission antennas 24-1 to 24-2 and reception antennas 31-1 to 31-4 are installed, for example, in an area near an upper edge portion of a windshield's edge portion of the vehicle (see FIG. 26).

In FIG. 9, for simplification of the drawing, devices for mounting the transmission antennas 24-1 to 24-2 on the windshield and devices for mounting the reception antennas 31-1 to 31-4 on the windshield are omitted.

In FIG. 9, each of the transmission antennas 24-1 to 24-2 has four element antennas and is represented as an array antenna. However, this is merely an example, and each of the transmission antennas 24-1 to 24-2 may have only one element antenna. In addition, element antennas may be installed not only in a longitudinal direction but also in a transverse direction in the drawing, thereby forming an array antenna.

In FIG. 9, a y-axis is an axis indicating an orthogonal direction to a plane on which the transmission antennas 24-1 to 24-2 and the reception antennas 31-1 to 31-4 are installed. A traveling direction of the vehicle coincides with the orientation of transmission RF signals radiated from radiation surfaces 24a-1 to 24a-2 of the transmission antennas 24-1 to 24-2. Note that the coincidence between the traveling direction and the orientation is not limited to exact coincidence, and the traveling direction and the orientation may be shifted from each other within a range with no practical problems.

An x-axis is an axis indicating a vehicle width direction of the vehicle, and a z-axis is an axis indicating a vertical direction orthogonal to a horizontal plane parallel to the traveling direction of the vehicle.

The arrangements of the respective transmission antennas 24-1 to 24-2 and reception antennas 31-1 to 31-4 differ from each other in a direction parallel to the x-axis, and the transmission antennas 24-1 to 24-2 and the reception antennas 31-1 to 31-4 are arranged in a row in the direction parallel to the x-axis.

The reception antennas 31-1 to 31-4 are arranged between the transmission antenna 24-1 and the transmission antenna 24-2, and a spacing between each two of the reception antennas 31-1 to 31-4 in the direction parallel to the x-axis is $d_{Rx}$.

Since the reception antennas 31-1 to 31-4 are arranged between the transmission antenna 24-1 and the transmission antenna 24-2, a spacing between the transmission antenna 24-1 and the transmission antenna 24-2 is wider than the apertures of the reception antennas 31-1 to 31-4.

The spacing between the transmission antenna 24-1 and the transmission antenna 24-2 has a width obtained by adding an integral multiple of the spacing $d_{RX}$ between each two of the reception antennas 31-1 to 31-4 to a width obtained by dividing the spacing $d_{RX}$ between each two of the reception antennas 31-1 to 31-4 by the number $N_{TX}$ of the transmission antennas 24-1 to 24-2. In an example of FIG. 9, the spacing between the transmission antenna 24-1 and the transmission antenna 24-2 is 7.5 $d_{RX}$ (=7$d_{RX}$+$d_{RX}$/2).

A spacing between the transmission antenna 24-1 (of the two transmission antennas, the other transmission antenna) and the reception antenna 31-1 (of the plurality of reception antennas, a reception antenna disposed so as to be adjacent to the other transmission antenna) is an integral multiple of the spacing $d_{RX}$ between each two of the reception antennas 31-1 to 31-4. In the example of FIG. 9, the spacing between the transmission antenna 24-1 and the reception antenna 31-1 is 2 $d_{RX}$ which is twice the spacing $d_{RX}$. Note that this is merely an example, and the spacing between the transmission antenna 24-1 and the reception antenna 31-1 may be, for example, 3 $d_{RX}$ which is three times the spacing $d_{RX}$.

A spacing between the reception antenna 31-4 (of the plurality of reception antennas, a reception antenna disposed so as to be adjacent to one transmission antenna) and the transmission antenna 24-2 (of the two transmission antennas, the one transmission antenna) has a width obtained by adding an integral multiple of the spacing $d_{RX}$ to a width obtained by dividing the spacing $d_{RX}$ by the number $N_{TX}$ of the transmission antennas 24-1 to 24-2. In the example of FIG. 9, the spacing between the reception antenna 31-4 and the transmission antenna 24-2 is 2.5 $d_{RX}$ (=$2d_{RX}$+$d_{RX}$/2).

Figure 10:
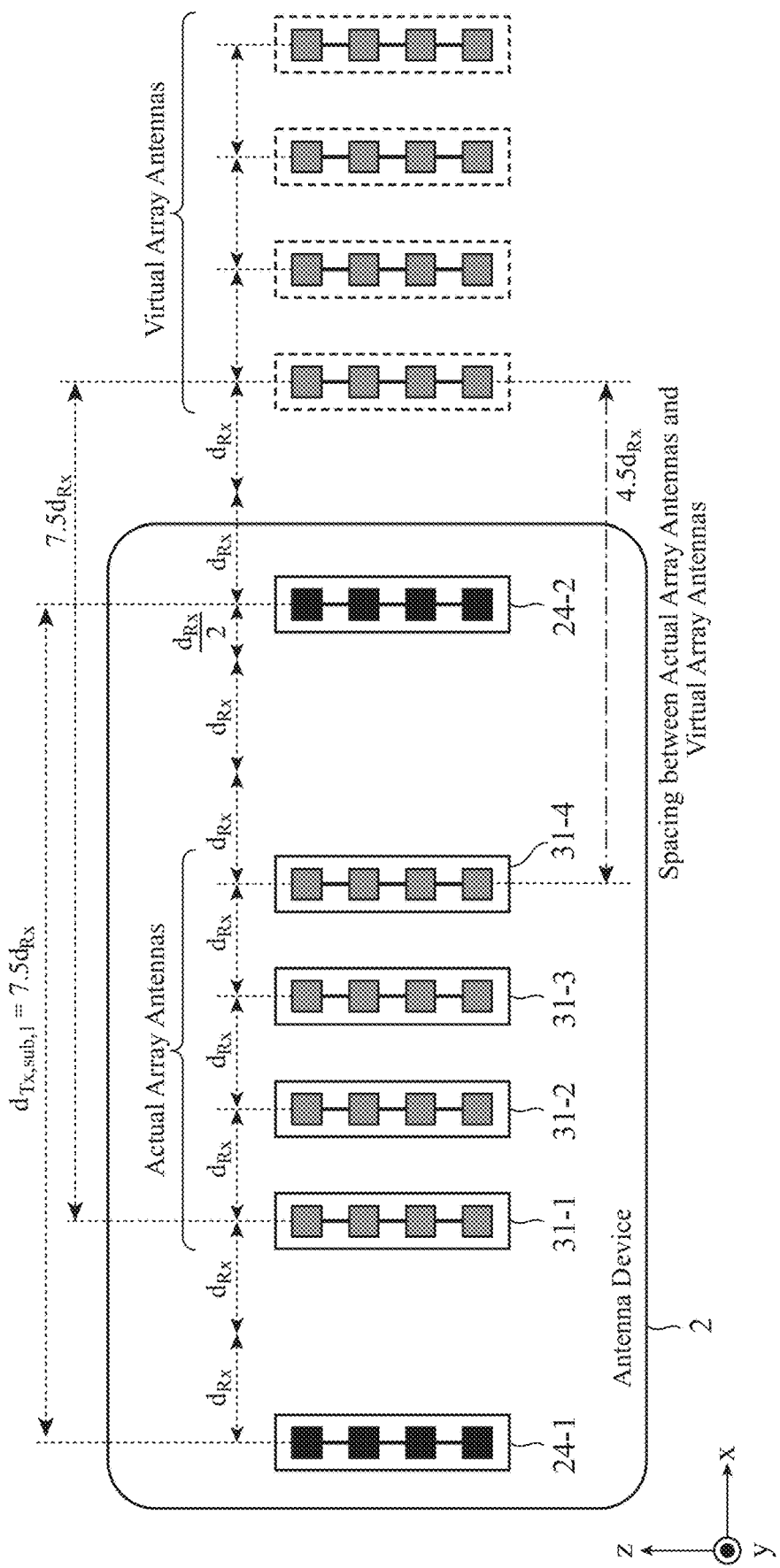
FIG. 10 is an explanatory diagram showing a relationship between actual array antennas and virtual array antennas.

FIG. 10 is an explanatory diagram showing a relationship between actual array antennas and virtual array antennas.

The actual array antennas are reception array antennas that actually exist, and the virtual array antennas are reception array antennas that are formed in a virtual manner.

The reception antennas 31-1 to 31-4 are the actual array antennas.

The transmission antennas 24-1 to 24-2 and the reception antennas 31-1 to 31-4 are arranged in a row in the direction parallel to the x-axis, and the reception antennas 31-1 to 31-4 are arranged between the transmission antenna 24-1 and the transmission antenna 24-2. Hence, virtual array antennas are formed in the same row as the reception antennas 31-1 to 31-4.

A plurality of virtual reception antennas included in the virtual array antennas are not reception antennas that actually exist. However, the virtual reception antennas can obtain, by signal processing, reflected RF signals corresponding to reflected RF signals received by the reception antennas 31-1 to 31-4 that actually exist.

Since the spacing between the transmission antenna 24-1 and the transmission antenna 24-2 is 7.5 $d_{RX}$, the virtual array antennas are formed at a location at which the spacing between the actual array antennas and the virtual array antennas has the following width.

The spacing between the actual array antennas and the virtual array antennas has a width obtained by adding an integral multiple of the spacing $d_{RX}$ between each two of the reception antennas 31-1 to 31-4 to a width obtained by dividing the spacing $d_{RX}$ between each two of the reception antennas 31-1 to 31-4 by the number $N_{TX}$ of the transmission antennas 24-1 to 24-2.

In an example of FIG. 10, the integral multiple=4 and $N_{TX}$=2, and the spacing between the actual array antennas and the virtual array antennas is 4.5 $d_{RX}$.

Next, the operations of the radar device 1 shown in FIG. 1 will be described.

The local oscillation signal generating unit 21 generates a local oscillation signal $L_1(h, t)$ such as that shown in the following expression (1) (step ST11 of FIG. 6).

$$L_1(h, t) = \begin{cases} A_L \exp\left(j\left[2\pi\left(f_0 t - \frac{B_0}{2T_0}t^2\right) + \phi_0\right]\right), \\ \quad hT_{chp} \le t < hT_{chp} + T_0 \\ 0, \text{ otherwise} \end{cases} \quad (1)$$

$(h = 0, 1, \ldots, H-1)$

In expression (1), $\varphi_0$ is the initial phase of the local oscillation signal. h is the hit number and H is the total count of hits.

$A_L$ is the amplitude of the local oscillation signal, $f_0$ is the transmission frequency of a transmission RF signal to be radiated from a transmission antenna 24-$n_{Tx}$ ($n_{Tx}$=1, ..., $N_{Tx}$), and $B_0$ is the modulation bandwidth of the transmission RF signal.

$T_0$ is the modulation time and t is the time.

$T_{chp}$ is the transmission repetition period of the transmission RF signal and is represented as shown in the following expression (2).

$T_{Tx}$ in expression (2) is the transmission repetition period and is represented as shown in the following expression (3):

$$T_{chp} = T_{Tx} \quad (2)$$

$$T_{Tx} = T_0 + T_1 \quad (3)$$

In expression (3), $T_1$ is the time from the modulation time $T_0$ to the next modulation.

The local oscillation signal generating unit 21 outputs the generated local oscillation signal $L_1(h, t)$ to each of the code modulating unit 22 and the receivers 32-1 to 32-$N_{Rx}$.

The code modulating unit 22 modulates the local oscillation signal $L_1(h, t)$ outputted from the local oscillation signal generating unit 21, using a modulation code corresponding to a transmission channel number $n_{Tx}$ of each of the transmission antennas 24-1 to 24-$N_{Tx}$, thereby generating $N_{Tx}$ transmission RF signals (step ST12 of FIG. 6).

A process of generating a transmission RF signal by the code modulating unit 22 will be specifically described below.

First, as shown in the following expression (4), the code modulating unit 22 cyclically shifts a cyclic code $C_0(h)$ by the amount of cyclic shift $\Delta h(n_{Tx})$ corresponding to the transmission channel number $n_{Tx}$, thereby generating a modulation code $Code_1(n_{Tx}, h)$ for a transmission channel indicated by the transmission channel number $n_{Tx}$.

The cyclic code $C_0(h)$ may be stored in an internal memory of the code modulating unit 22 or may be provided from a source external to the radar device 1.

The code modulating unit 22 may use, as the cyclic code $C_0(h)$, a maximal length sequence (M-sequence) or may use, as the cyclic code $C_0(h)$, a Gold sequence or a Kasami sequence.

$Code_1(n_{Tx}, h) = Shift(C_0(h), \Delta h(n_{Tx}))$ $(h=0,1,\ldots,H-1)$ $(n_{Tx}=0,1,\ldots,N_{Tx}-1) \quad (4)$ In expression (4), $Shift(C_0(h), \Delta h(n_{Tx}))$ is a mathematical symbol indicating that the cyclic code $C_0(h)$ is cyclically shifted by the amount of cyclic shift $\Delta h(n_{Tx})$.

Then, as shown in the following expression (5), the code modulating unit 22 multiplies the local oscillation signal $L_1(h, t)$ by the modulation code $Code_1(n_{Tx}, h)$, thereby generating a transmission RF signal $Tx_1(n_{Tx}, h, t)$ for a transmission channel corresponding to the transmission channel number $n_{Tx}$:

$Tx_1(n_{Tx}, h, t) = L_1(h, t) Code_1(n_{Tx}, h)$ $(h=0,1,\ldots,H-1)$ $(n_{Tx}=0,1,\ldots N_{Tx}-1) \quad (5)$ The code modulating unit 22 outputs the transmission RF signal $Tx_1(n_{Tx}, h, t)$ for a transmission channel indicated by the transmission channel number $n_{Tx}$ to the transmitter 23-$n_{Tx}$, and outputs the modulation code $Code_1(n_{Tx}, h)$ for the transmission channel indicated by the transmission channel number $n_{Tx}$ to the signal processor 13.

When the transmitter 23-$n_{Tx}$ receives the transmission RF signal $Tx_1(n_{Tx}, h, t)$ from the code modulating unit 22, the transmitter 23-$n_{Tx}$ outputs the transmission RF signal $Tx_1(n_{Tx}, h, t)$ to the transmission antenna 24-$n_{Tx}$.

The transmission antenna 24-$n_{Tx}$ radiates the transmission RF signal $Tx_1(n_{Tx}, h, t)$ into space from the radiation surface 24a-$n_{Tx}$ (step ST1 of FIG. 5 and step ST13 of FIG. 6).

Since the radiation surface 24a-$n_{Tx}$ of the transmission antenna 24-$n_{Tx}$ is orthogonal to a direction parallel to the y-axis, the orientation of the transmission RF signal $Tx_1(n_{Tx}, h, t)$ coincides with the traveling direction of the vehicle.

Note that $N_{Tx}$ transmission RF signals $Tx_1(1, h, t)$ to $Tx_1(N_{Tx}, h, t)$ to be radiated from the transmission antennas 24-1 to 24-$N_{Tx}$ are radiated nearly simultaneously.

The transmission RF signals $Tx_1(1, h, t)$ to $Tx_1(N_{Tx}, h, t)$ radiated from the transmission antennas 24-1 to 24-$N_{Tx}$ are reflected by a target present in space. The transmission RF signals $Tx_1(1, h, t)$ to $Tx_1(N_{Tx}, h, t)$ reflected by the target enter the reception antennas 31-1 to 31-$N_{Rx}$, as reflected RF signals $Rx_0(n_{Tx}, n_{Rx}, h, t)$.

A reception antenna 31-$n_{Rx}$ ($n_{Rx}=1, \ldots, N_{Rx}$) outputs the entered reflected RF signals $Rx_0(n_{Tx}, n_{Rx}, h, t)$ to the receiver 32-$n_{Rx}$, as a reception RF signal $Rx_1(n_{Rx}, h, t)$ for a reception channel indicated by a reception channel number $n_{Rx}$ (step ST21 of FIG. 7).

The reception RF signal $Rx_1(n_{Rx}, h, t)$ is represented as shown in the following expression (6):

$$Rx_1(n_{RX}, h, t) = \sum_{n_{Tx}=0}^{N_{Tx}-1} Rx_0(n_{Tx}, n_{Rx}, h, t) \quad (6)$$

$$(h = 0, 1, \ldots, H-1)$$

$$(n_{Rx} = 0, 1, \ldots, N_{Rx}-1)$$

A reflected RF signal $Rx_0(n_{Tx}, n_{Rx}, h, t)$ in expression (6) is represented as shown in the following expression (7):

$$Rx_0(n_{Tx}, n_{Rx}, h, t) = \quad (7)$$

$$\begin{cases} A_R \exp\left(j\left\{2\pi\left[f_0\left(t' - \frac{2(R_0-vt)}{c}\right) - \frac{B_0}{2T_0}\right.\right.\right. \\ \left.\left.\left.\left(t' - \frac{2(R_0-vt)}{c}\right)^2\right] + \phi_0\right\}\right) \\ Code_1(n_{Tx}, h)\exp(j\varphi_{Tx}(n_{Tx}))\exp(j\varphi_{Rx}(n_{Rx})), \\ hT_{chp} - \frac{2R_0}{c} \leq t < hT_{chp} - \frac{2R_0}{c} + T_0 \\ 0, \text{ otherwise} \end{cases}$$

$$(h = 0, 1, \ldots, H-1)$$

$$(n_{Tx} = 0, 1, \ldots, N_{Tx}-1)$$

$$(n_{Rx} = 0, 1, \ldots, N_{Rx}-1)$$

In expression (7), $A_R$ is the amplitude of the reception RF signal $Rx_1(n_{Rx}, h, t)$. $R_0$ is the initial relative distance to the target, and the initial relative distance to the target is the initial value of the relative distance of the radar device 1 to the target. v is the relative speed to the target, and the relative speed to the target is the relative speed of the radar device 1 to the target.

c is the speed of light and t' is the time during one hit.

In expression (7), $\varphi_{Tx}(n_{Tx})$ is the phase difference for the transmission channel indicated by the transmission channel number $n_{Tx}$, and is represented as shown in the following expression (8).

$\varphi_{Rx}(n_{Rx})$ is the phase difference for the reception channel indicated by the reception channel number $n_{Rx}$, and is represented as shown in the following expression (9):

$$\varphi_{Tx}(n_{Tx}) = 2\pi f_0 \frac{\varepsilon_{Tgt} \cdot P_{Tx}(n_{Tx})}{c} \quad (8)$$

$$(n_{Tx} = 0, 1, \ldots, N_{Tx}-1)$$

$$\varphi_{Rx}(n_{Rx}) = 2\pi f_0 \frac{\varepsilon_{Tgt} \cdot P_{Rx}(n_{Rx})}{c} \quad (9)$$

$$(n_{Rx} = 0, 1, \ldots, N_{Rx}-1)$$

In expressions (8) and (9), $\varepsilon_{tgt}$ is, as represented by the following expression (10), a unit vector in a target direction, with the azimuth angle being $\theta_{AZ, tgt}$ and the elevation angle being $\theta_{EL, tgt}$. "·" is a mathematical symbol indicating an inner product.

In expression (8), $P_{Tx}(n_{Tx})$ is the position vector of the transmission antenna 24-$n_{Tx}$ which is represented by the following expression (11).

In expression (9), $P_{Rx}(n_{Rx})$ is the position vector of the reception antenna 31-$n_{Rx}$ which is represented by the following expression (12).

$$\varepsilon_{tgt} = [\cos\theta_{EL,tgt}\sin\theta_{AZ,gt}\cos\theta_{EL,tgt}\cos\theta_{AZ,tgt}\sin\theta_{EL,tgt}] \quad (10)$$

$$P_{Tx}(n_{Tx}) = \begin{bmatrix} p_{Tx,x}(n_{Tx}) \\ p_{Tx,y}(n_{Tx}) \\ p_{Tx,z}(n_{Tx}) \end{bmatrix} \quad (11)$$

$$(n_{Tx} = 0, 1, \ldots, N_{Tx}-1)$$

$$P_{Rx}(n_{Rx}) = \begin{bmatrix} p_{Rx,x}(n_{Rx}) \\ p_{Rx,y}(n_{Rx}) \\ p_{Rx,z}(n_{Rx}) \end{bmatrix} \quad (12)$$

$$(n_{Rx} = 0, 1, \ldots, N_{Rx}-1)$$

In expression (11), $p_{Tx,x}(n_{Tx})$ is the x-coordinate of the transmission antenna 24-$n_{Tx}$, $p_{Tx,y}(n_{Tx})$ is the y-coordinate of the transmission antenna 24-$n_{Tx}$, and $p_{Tx,z}(n_{Tx})$ is the z-coordinate of the transmission antenna 24-$n_{Tx}$.

In expression (12), $p_{Rx,x}(n_{Rx})$ is the x-coordinate of the reception antenna 31-$n_{Rx}$, $p_{Rx,y}(n_{Rx})$ is the y-coordinate of the reception antenna 31-$n_{Rx}$, and $p_{Rx,z}(n_{Rx})$ is the z-coordinate of the reception antenna 31-$n_{Rx}$.

When the receiver 32-$n_{Rx}$ receives the reception RF signal $Rx_1(n_{Rx}, h, t)$ from the reception antenna 31-$n_{Rx}$, the receiver 32-$n_{Rx}$ down-converts the frequency of the reception RF signal $Rx_1(n_{Rx}, h, t)$, using the local oscillation signal $L_1(h, t)$ outputted from the local oscillation signal generating unit 21.

Then, the receiver 32-$n_{Rx}$, for example, filters the down-converted reception RF signal, using a bandpass filter, thereby amplifying the strength of the signal having passed through the bandpass filter.

The receiver 32-$n_{Rx}$ detects the phase of the signal whose strength has been amplified, thereby generating, as shown in the following expression (13), a reception beat signal V' $i(n_{Rx}, h, t)$ for the reception channel indicated by the reception channel number $n_{Rx}$ (step ST22 of FIG. 7).

$$V'_1(n_{Rx}, h, t) = \sum_{n_{Tx}=0}^{N_{Tx}-1} V'_0(n_{Tx}, n_{Rx}, h, t) = Rx_1(n_{Rx}, h, t)L_1^*(h, t) \quad (13)$$

$$(h = 0, 1, \ldots, H-1)$$

$$(n_{Rx} = 0, 1, \ldots, N_{Rx}-1)$$

The reception beat signal $V'_1(n_{Rx}, h, t)$ represented by expression (13) is obtained, as shown in the following expression (14), by adding together reception beat signals $V'_0(n_{Tx}, n_{Rx}, h, t)$ corresponding to each of the transmission channel $n_{Tx}$ and the reception channel $n_{Rx}$:

$$V'_0(n_{Tx}, n_{Rx}, h, t) = Rx_0(n_{Tx}, n_{Rx}, h, t)L_1^*(n_{Tx}, h, t) = \tag{14}$$

$$\begin{cases} A_V \exp\left(j\left\{2\pi\left[\begin{array}{c}-f_0\dfrac{2(R_0-vt)}{c}-\dfrac{B_0}{2T_0}\\ \left(-\dfrac{4(R_0-vt)}{c}t' + \dfrac{4(R_0-vt)}{c^2}\right)^2\end{array}\right]\right\}\right) \\ \quad Code_1(n_{Tx}, h)\exp(j\varphi_{Tx}(n_{Tx}))\exp(j\varphi_{Rx}(n_{Rx})), \\ \quad hT_{chp} - \dfrac{2R_0}{c} \le t < hT_{chp} - \dfrac{2R_0}{c} + T_0 \\ 0, \text{ otherwise} \end{cases}$$

$(h = 0, 1, \ldots, H-1)$ $(n_{Tx} = 0, 1, \ldots, N_{Tx}-1)$ $(n_{Rx} = 0, 1, \ldots, N_{Rx}-1)$ In expression (14), Av is the amplitude of the reception beat signal $V'_0(n_{Tx}, n_{Rx}, h, t)$.

The receiver 32-$n_{Rx}$ outputs the reception beat signal $V'_1(n_{Rx}, h, t)$ to the A/D converter 33-$n_{Rx}$.

When the A/D converter 33-$n_{Rx}$ receives the reception beat signal $V'_1(n_{Rx}, h, t)$ from the receiver 32-$n_{Rx}$, the A/D converter 33-$n_{Rx}$ converts the reception beat signal $V'_1(n_{Rx}, h, t)$ from an analog signal to a digital signal (step ST23 of FIG. 7).

The A/D converter 33-$n_{Rx}$ outputs the digital signal to the signal processor 13, as a reception beat signal $V'_1(n_{Rx}, h, m)$ represented by the following expression (15) (step ST2 of FIG. 5):

$$V_1(n_{Rx}, h, m) = \sum_{n_{Tx}=0}^{N_{Tx}-1} V_0(n_{Tx}, n_{Rx}, h, m) \tag{15}$$

$(m - 0, 1, \ldots, M-1)$ $(h = 0, 1, \ldots, H-1)$ $(n_{Rx} = 0, 1, \ldots, N_{Rx}-1)$ The reception beat signal $V'_1(n_{Rx}, h, m)$ outputted from the A/D converter 33-$n_{Rx}$ is obtained, as shown in the following expression (16), by adding together reception beat signals $V_0(n_{Tx}, n_{Rx}, h, t)$ corresponding to each of the transmission channel $n_{Tx}$ and the reception channel $n_{Rx}$:

$$V_0(n_{Tx}, n_{Rx}, h, m) \cong \tag{16}$$

$$\begin{cases} A\exp\left(-j2\pi f_0\dfrac{2(R_0-v(hT_{chp}+m\Delta t))}{c}\right) \\ \quad \exp\left(j2\pi\dfrac{2B_0}{cT_0}(R_0-vhT_{chp})m\Delta t\right) \\ \quad Code_1(n_{Tx}, h)\exp(j\varphi_{Tx}(n_{Tx}))\exp(j\varphi_{Rx}(n_{Rx})), \\ n_{Tx}T_{Tx} + hT_{chp} - \dfrac{2R_0}{c} \le t < n_{Tx}T_{Tx}hT_{chp} - \dfrac{2R_0}{c} + T_0 \\ 0, \text{ otherwise} \end{cases}$$

$(m - 0, 1, \ldots, M-1)$ $(h = 0, 1, \ldots, H-1)$ $(n_{Tx} = 0, 1, \ldots, N_{Tx}-1)$ $(n_{Rx} = 0, 1, \ldots, N_{Rx}-1)$ In expression (16), $\Delta t$ is the sampling interval during the modulation time $T_0$. m is the sampling number of a reception beat signal sampled during the modulation time $T_0$. M is the total count of samplings of the reception beat signal during the modulation time $T_0$.

The signal processor 13 coherently integrates reception beat signals $V'_1(1, h, m)$ to $V'_1(N_{Rx}, h, m)$ outputted from the A/D converters 33-1 to 33-$N_{Rx}$, on the basis of the arrangement of each of the transmission antennas 24-1 to 24-$N_{Tx}$ and the reception antennas 31-1 to 31-$N_{Rx}$.

The signal processor 13 measures the angle of the target from a coherent-integration signal which is a result of the coherent integration of the reception beat signals $V'_1(1, h, m)$ to $V'_1(N_{Rx}, h, m)$.

A process of measuring the angle of the target by the signal processor 13 will be specifically described below.

The separating unit 41 obtains modulation codes $Code_1(1, h)$ to $Code_1(N_{Tx}, h)$ outputted from the code modulating unit 22, and obtains reception beat signals $V'_1(1, h, m)$ to $V'_1(N_{Rx}, h, m)$ outputted from the A/D converters 33-1 to 33-$N_{Rx}$.

The separating unit 41 demodulates a reception beat signal $V_{1,C}(n_{Tx}, n_{Rx}, h, m)$ corresponding to both a transmission channel number $n_{Tx}$ and a reception channel number $n_{Rx}$ from a reception beat signal $V'_1(n_{Rx}, h, m)$, using a modulation code $Code_1(n_{Tx}, h)$ (step ST31 of FIG. 8).

The demodulated reception beat signal $V_{1,C}(n_{Tx}, n_{Rx}, h, m)$ is being separated for each transmission channel and separated for each reception channel, and is represented as shown in the following expression (17).

The separating unit 41 outputs the demodulated reception beat signal $V_{1,C}(n_{Tx}, n_{Rx}, h, m)$ to the signal generating unit 42.

$$V_{1,C}(n_{Tx}, n_{Rx}, h, m) = V_1(n_{Rx}, h, m)Code_1(n_T, h) = \tag{17}$$

$$V_{0,C}(n_{Tx}, n_{Rx}, h, m) + \sum_{n'_{Tx}} V'_{0,C}(n'_{Tx}, n_{Rx}, h, m)$$

$(m - 0, 1, \ldots, M-1)$ $(h = 0, 1, \ldots, H-1)$ $(n_{Tx} = 0, 1, \ldots, N_{Tx}-1)$ $(n'_{Tx} \ne n_{Tx})$ $(n_{Rx} = 0, 1, \ldots, N_{Rx}-1)$ As shown in the following expression (18), the demodulated reception beat signal $V_{1,C}(n_{Tx}, n_{Rx}, h, m)$ is represented as a signal $V_{0,C}(n_{Tx}, n_{Rx}, h, m)$ that matches the modulation code $Code_1(n_{Tx}, h)$ and is autocorrelated.

In addition, as shown in the following expression (19), the demodulated reception beat signal $V_{1,C}(n_{Tx}, n_{Rx}, h, m)$ is represented as a signal $V'_{0,C}(n'_{Tx}, n_{Rx}, h, m)$ with a transmission channel number n'Tx that does not match the modulation code $Code_1(n_{Tx}, h)$ and is cross-correlated. The expression "does not match the modulation code $Code_1(n_{Tx}, h)$" indicates that $n_{Tx} \ne n'_{Tx}$.

$$V_{0,C}(n_{Tx}, n_{Rx}, h, m) \cong \begin{cases} A\exp\left(-j2\pi f_0 \frac{2(R_0 - v(hT_{chp} + m\Delta t))}{c}\right) \\ \exp\left(j2\pi \frac{2B_0}{cT_0}(R_0 - vhT_{chp})m\Delta t\right) \\ \exp(j\varphi_{Tx}(n_{Tx}))\exp(j\varphi_{Rx}(n_{Rx})), \\ hT_{chp} - \frac{2R_0}{c} \le t < hT_{chp} - \frac{2R_0}{c} + T_0 \\ 0, \text{ otherwise} \end{cases} \quad (18)$$

$(m = 0, 1, \ldots, M-1)$
$(h = 0, 1, \ldots, H-1)$
$(n_{Tx} = 0, 1, \ldots, N_{Tx}-1)$
$(n_{Rx} = 0, 1, \ldots, N_{Rx}-1)$ $$V_{0,C}(n'_{Tx}, n_{Rx}, h, m) \cong \quad (19)$$

$$\begin{cases} A\exp\left(-j2\pi f_0 \frac{2(R_0 - v(hT_{chp} + m\Delta t))}{c}\right) \\ \exp\left(j2\pi \frac{2B_0}{cT_0}(R_0 - vhT_{chp})m\Delta t\right) \\ Code_1(n_{Tx}, h)Code_1(n'_{Tx}, h)\exp(j\varphi_{Tx}(n_{Tx}))\exp(j\varphi_{Rx}(n_{Rx})), \\ hT_{chp} - \frac{2R_0}{c} \le t < hT_{chp} - \frac{2R_0}{c} + T_0 \\ 0, \text{ otherwise} \end{cases}$$

$(m = 0, 1, \ldots, M-1)$
$(h = 0, 1, \ldots, H-1)$
$(n_{Tx} = 0, 1, \ldots, N_{Tx}-1)$
$(n'_{Tx} \ne n_{Tx})$
$(n_{Rx} = 0, 1, \ldots, N_{Rx}-1)$ The signal generating unit 42 performs a discrete Fourier transform on the demodulated reception beat signal $V_{1,C}(n_{Tx}, n_{Rx}, h, m)$ outputted from the separating unit 41, thereby generating, as shown in the following expression (20), a distance and speed signal $f_{b,1}(n_{Tx}, n_{Rx}, q, k)$ corresponding to both a transmission channel number $n_{Tx}$ and a reception channel number $n_{Rx}$ (step ST32 of FIG. 8).

The distance and speed signal $f_{b,1}(n_{Tx}, n_{Rx}, q, k)$ includes each of distance information about the distance to a target candidate and speed information about the speed of the target candidate.

$$f_{b,1}(n_{Tx}, n_{Rx}, q, k) = \quad (20)$$

$$\sum_{h=0}^{H-1}\left[\sum_{m=0}^{M-1} V_{1,C}(n_{Tx}, n_{Rx}, h, m)\exp\left(-j2\pi\frac{m}{M}k\right)\right]\exp\left(-j2\pi\frac{h}{H}q\right)$$

$(k = 0, 1, \ldots, M-1)$
$(q = 0, 1, \ldots, H-1)$
$(n_{Rx} = 0, 1, \ldots, N_{Rx}-1)$
$(n_{Tx} = 0, 1, \ldots, N_{Tx}-1)$ In expression (20), q is the speed bin number and k is the distance bin number.

The signal generating unit 42 outputs the distance and speed signal $f_{b,1}(n_{Tx}, n_{Rx}, q, k)$ to the incoherent integration unit 43.

Figure 11A:
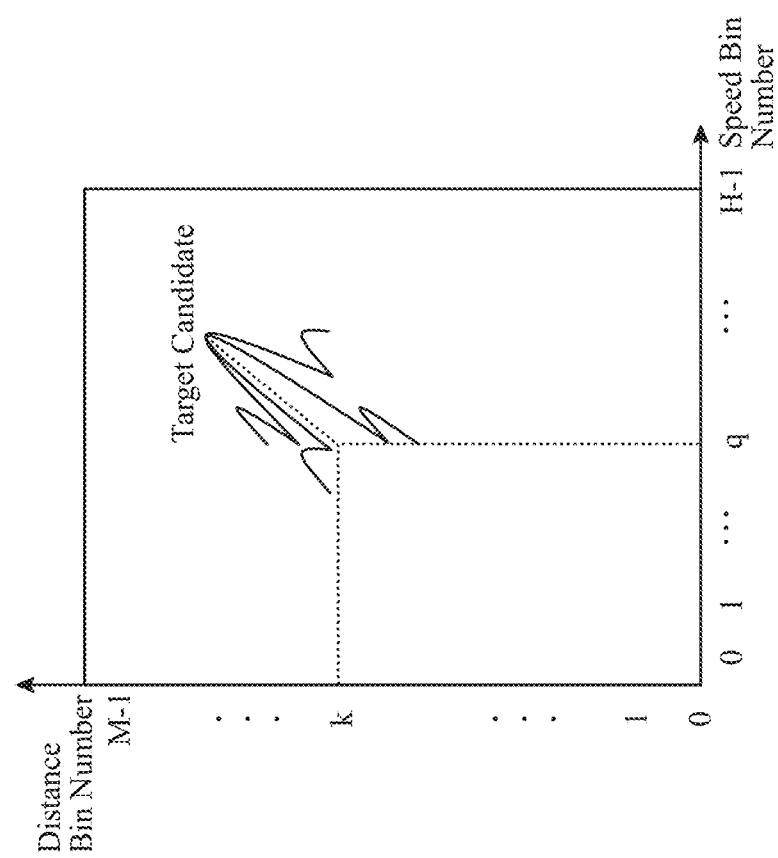
FIG. 11A is an explanatory diagram showing a relationship between the sampling number and hit number of a demodulated reception beat signal $V_{1,C}(n_{Tx}, n_{Rx}, h, m)$.

FIG. 11A is an explanatory diagram showing a relationship between the sampling number and hit number of the demodulated reception beat signal $V_{1,C}(n_{Tx}, n_{Rx}, h, m)$.

Figure 11B:
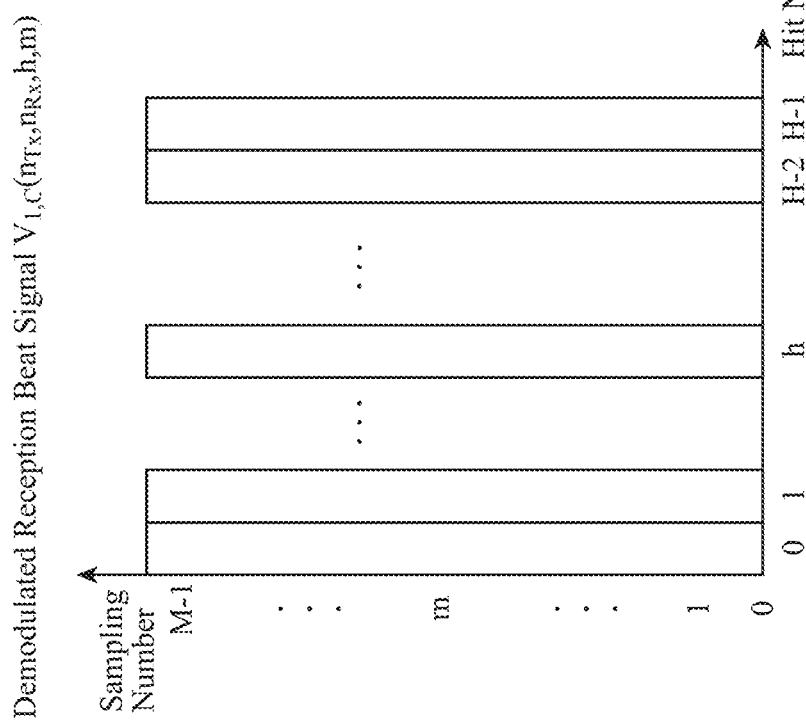
FIG. 11B is an explanatory diagram showing a relationship between the distance bin number k and speed bin number q of a distance and speed signal $f_{b,1}(n_{Tx}, n_{Rx}, q, k)$.

FIG. 11B is an explanatory diagram showing a relationship between the distance bin number k and speed bin number q of the distance and speed signal $f_{b,1}(n_{Tx}, n_{Rx}, q, k)$.

When the incoherent integration unit 43 receives the distance and speed signal $f_{b,1}(n_{Tx}, n_{Rx}, q, k)$ from the signal generating unit 42, the incoherent integration unit 43 incoherently integrates the distance and speed signal $f_{b,1}(n_{Tx}, n_{Rx}, q, k)$ (step ST33 of FIG. 8).

The incoherent integration unit 43 outputs an incoherent-integration signal $f_{b,1,inch}(q, k)$ represented by the following expression (21), as a result of the incoherent integration of the distance and speed signal $f_{b,1}(n_{Tx}, n_{Rx}, q, k)$, to the target candidate detecting unit 44.

$$f_{b,1,inch}(q, k) = \sum_{n_{Tx}=0}^{N_{Tx}-1}\sum_{n_{Rx}=0}^{N_{Rx}-1} |f_{b,1}(n_{Tx}, n_{Rx}, q, k)|^2 \quad (21)$$

$(k = 0, 1, \ldots, M-1)$
$(q = 0, 1, \ldots, H-1)$

Figure 12B:
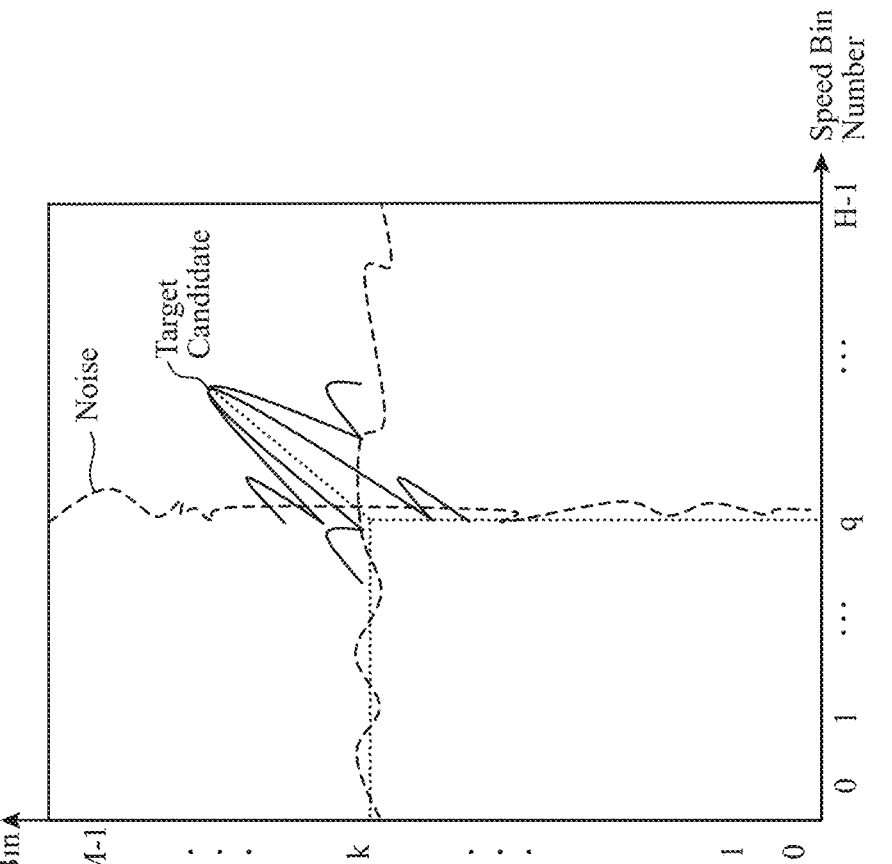
FIG. 12B is an explanatory diagram showing a relationship between the distance bin number k and the speed bin number q of an incoherent-integration signal $f_{b,1,inch}(q, k)$.
Figure 12A:
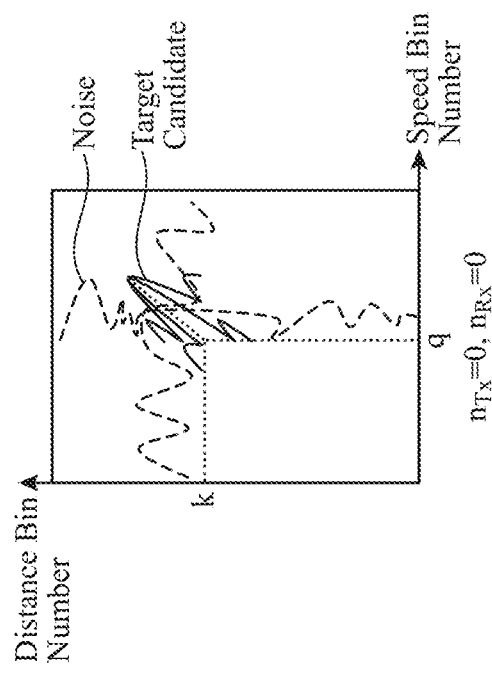
FIG. 12A is an explanatory diagram showing a relationship between the distance bin number k and speed bin number q of the distance and speed signal $f_{b,1}(n_{Tx}, n_{Rx}, q, k)$.

FIG. 12A is an explanatory diagram showing a relationship between the distance bin number k and speed bin number q of the distance and speed signal $f_{b,1}(n_{Tx}, n_{Rx}, q, k)$.

The distance and speed signal $f_{b,1}(n_{Tx}, n_{Rx}, q, k)$ includes the distance bin number k and speed bin number q of a target candidate at a time when $n_{Tx}=0$ and $n_{Rx}=0$, the distance bin number k and speed bin number q of the target candidate at a time when $n_{Tx}=1$ and $n_{Rx}=1, \ldots$, and the distance bin number k and speed bin number q of the target candidate at a time when $n_{Tx}=N_{Tx}-1$ and $n_{Rx}=N_{Rx}-1$.

The distance and speed signal $f_{b,1}(n_{Tx}, n_{Rx}, q, k)$ has noise superimposed thereon, in addition to information about the target candidate.

FIG. 12B is an explanatory diagram showing a relationship between the distance bin number k and speed bin number q of the incoherent-integration signal $f_{b,1,inch}(q, k)$.

Since the incoherent-integration signal $f_{b,1,}$ inch(q, k) is a signal obtained by integrating the signal strengths of a plurality of distance and speed signals $f_{b,1}(n_{Tx}, n_{Rx}, q, k)$, noise included in the plurality of distance and speed signals $f_{b,1}(n_{Tx}, n_{Rx}, q, k)$ is averaged and the influence of the noise is reduced.

When the target candidate detecting unit 44 receives the incoherent-integration signal $f_{b,1,}$ inch(q, k) from the incoherent integration unit 43, the target candidate detecting unit 44 detects a target candidate on the basis of the signal strength of the incoherent-integration signal $f_{b,1,}$ inch(q, k). A target candidate number that identifies the detected target candidate is hereinafter $n_{tgt}$.

For a process of detecting a target candidate, for example, a cell average constant false alarm rate (CA-CFAR) process can be used.

The target candidate detecting unit 44 identifies a speed bin number $q_{ntgt}$ which is the sampling number in a speed direction of the target candidate corresponding to the target candidate number $n_{tgt}$, and a distance bin number $k_{ntgt}$ which is the sampling number in a distance direction of the target candidate corresponding to the target candidate number $n_{tgt}$.

The target candidate detecting unit 44 calculates a distance $L(n_{Tgt})$ to the target candidate from the identified distance bin number $k_{ntgt}$, and calculates a speed $v(n_{Tgt})$ of the target candidate from the identified speed bin number $q_{ntgt}$ (step ST34 of FIG. 8).

A process itself of calculating the distance $L(n_{Tgt})$ to the target candidate from the distance bin number $k_{ntgt}$ is a publicly known technique and thus a detailed description thereof is omitted. In addition, a process itself of calculating the speed $v(n_{Tgt})$ of the target candidate from the speed bin number $q_{ntgt}$ is a publicly known technique and thus a detailed description thereof is omitted.

The target candidate detecting unit 44 outputs each of the distance $L(n_{Tgt})$ to the target candidate and the speed $v(n_{Tgt})$ of the target candidate to the display unit 14.

The target candidate detecting unit 44 outputs a distance and speed signal $f_{b,1}(n_{Tx}, n_{Rx}, q_{ntgt}, k_{ntgt})$ corresponding to the detected target candidate among the plurality of distance and speed signals $f_{b,1}(n_{Tx}, n_{Rx}, q, k)$ outputted from the signal generating unit 42, to the coherent integration unit 45.

The distance and speed signal $f_{b,1}(n_{Tx}, n_{Rx}, q_{ntgt}, k_{ntgt})$ corresponding to the detected target candidate is a distance and speed signal $f_{b,1}(n_{Tx}, n_{Rx}, q_{ntgt}, k_{ntgt})$ corresponding to each of the identified distance bin number $k_{ntgt}$ and the identified speed bin number $q_{ntgt}$.

In addition, the target candidate detecting unit 44 outputs each of the identified distance bin number $k_{ntgt}$ and the identified speed bin number $q_{ntgt}$ to the coherent integration unit 45.

The coherent integration unit 45 coherently integrates the distance and speed signal $f_{b,1}(n_{Tx}, n_{Rx}, q_{ntgt}, k_{ntgt})$ outputted from the target candidate detecting unit 44, on the basis of the arrangement of each of the transmission antennas 24-1 to 24-$N_{Tx}$ and the reception antennas 31-1 to 31-$N_{Rx}$ (step ST35 of FIG. 8).

The coherent integration unit 45 coherently integrates the distance and speed signal $f_{b,1}(n_{Tx}, n_{Rx}, q_{ntgt}, k_{ntgt})$ between the transmission channels and between the reception channels, thereby obtaining a coherent-integration signal $R_{Tx,Rx,ch}(n_{EL}, n_{AZ}, q_{ntgt}, k_{ntgt})$ such as that shown in the following expression (22), as a result of the coherent integration of the distance and speed signal $f_{b,1}(n_{Tx}, n_{Rx}, q_{ntgt}, k_{ntgt})$. In expression (22), the distance and speed signal $f_{b,1}(n_{Tx}, n_{Rx}, q_{ntgt}, k_{ntgt})$ is coherently integrated by performing a discrete Fourier transform on the distance and speed signal $f_{b,1}(n_{Tx}, n_{Rx}, q_{ntgt}, k_{ntgt})$.

$$R_{Tx,Rx,c,b}(n_{EL}, n_{AZ}, q_{ntgt}, k_{ntgt}) = \sum_{n_{Tx}=0}^{N_{Tx}-1} \sum_{n_{Rx}=0}^{N_{Rx}-1} \begin{Bmatrix} f_d(n_{Tx}, n_{Rx}, q_{ntgt}, k_{ntgt}) \\ \exp(-j\varphi'_{Tx}(n_{Tx}, \theta_{EL}(n_{EL}), \theta_{AZ}(n_{AZ}))) \\ \exp(-j\varphi'_{Rx}(n_{Rx}, \theta_{EL}(n_{EL}), \theta_{AZ}(n_{AZ}))) \end{Bmatrix} \quad (22)$$

$$(n_{tgt} = 0, 1, \ldots, N_{tgt} - 1)$$
$$(n_{AZ} = 0, 1, \ldots, N_{AZ} - 1)$$
$$(n_{EL} = 0, 1, \ldots, N_{EL} - 1)$$

In expression (22), $N_{EL}$ is the number of assumed target elevation angles and $n_{EL}$ is the target elevation angle number assigned to an assumed target elevation angle.

$N_{AZ}$ is the number of assumed target azimuth angles and $n_{AZ}$ is the target azimuth angle number assigned to an assumed target azimuth angle.

$\varphi'_{Tx}(n_{Tx}, n_{EL}, n_{AZ})$ is the phase difference for the transmission channel number $n_{Tx}$ and for the target elevation angle number $n_{EL}$ and the target azimuth angle number $n_{AZ}$, and is represented as shown in the following expression (23).

$\varphi'_{Rx}(n_{Rx}, n_{EL}, n_{AZ})$ is the phase difference for the reception channel number $n_{Rx}$ and for the target elevation angle number $n_{EL}$ and the target azimuth angle number $n_{AZ}$, and is represented as shown in the following expression (24).

A unit vector $\varepsilon(n_{EL}, n_{AZ})$ in a target direction assumed for the target elevation angle number $n_{EL}$ and the target azimuth angle number $n_{AZ}$ is represented as shown in the following expression (25).

Note that since the central phase of the transmission antennas 24-1 to 24-2 and the central phase of the reception antennas 31-1 to 31-4 shown in FIG. 9 are identical to each other with respect to a perpendicular direction, the number of target elevation angle numbers may be one.

$$\varphi'_{Tx}(n_{Tx}, n_{EL}, n_{AZ}) = 2\pi f_0 \frac{\varepsilon(n_{EL}, n_{AZ}) \cdot P_{Tx}(n_{Tx})}{c} \quad (23)$$
$$(n_{EL} = 0, 1, \ldots, N_{EL} - 1)$$
$$(n_{AZ} = 0, 1, \ldots, N_{AZ} - 1)$$
$$(n_{Tx} = 0, 1, \ldots, N_{Tx} - 1)$$

$$\varphi'_{Rx}(n_{Rx}, n_{EL}, n_{AZ}) = 2\pi f_0 \frac{\varepsilon(n_{EL}, n_{AZ}) \cdot P_{Rx}(n_{Rx})}{c} \quad (24)$$
$$(n_{EL} = 0, 1, \ldots, N_{EL} - 1)$$
$$(n_{AZ} = 0, 1, \ldots, N_{AZ} - 1)$$
$$(n_{Rx} = 0, 1, \ldots, N_{Rx} - 1)$$

$$\varepsilon(n_{EL}, n_{AZ}) = \quad (25)$$
$$[\cos\theta_{EL}(n_{EL})\sin\theta_{AZ}(n_{AZ}) \; \cos\theta_{EL}(n_{EL})\cos\theta_{AZ}(n_{AZ}) \; \sin\theta_{EL}(n_{EL})]$$

The coherent integration unit 45 outputs the coherent-integration signal $R_{Tx,Rx,ch}(n_{EL}, n_{AZ}, q_{ntgt}, k_{ntgt})$ to the angle calculating unit 46.

As shown in the following expression (26), the signal power of the coherent-integration signal $R_{Tx,Rx,ch}(n_{EL}, n_{AZ}, q_{ntgt}, k_{ntgt})$ has a maximum value when a difference between the phase difference $\varphi_{Tx}(n_{Tx})$ and the phase difference $\varphi'_{Tx}(n_{Tx}, n_{EL}, n_{AZ})$ for the transmission channel is zero and a difference between the phase difference $\varphi_{Rx}(n_{Rx})$ and the phase difference $\varphi'_{Rx}(n_{Rx}, n_{EL}, n_{AZ})$ for the reception channel is zero.

By measuring the angle of the target using the coherent-integration signal $R_{Tx,Rx,ch}(n_{EL}, n_{AZ}, q_{ntgt}, k_{ntgt})$ whose signal power has the maximum value, the accuracy of measurement of the angle of the target improves.

$$\sum_{n_{Tx}=0}^{N_{Tx}-1} [\varphi_{Tx}(n_{Tx}) - \varphi'_{Tx}(n_{Tx}, n_{EL}, n_{AZ})] + \quad (26)$$

$$\sum_{n_{Rx}=0}^{N_{Rx}-1} [\varphi_{Rx}(n_{Rx}) - \varphi'_{Rx}(n_{Rx}, n_{EL}, n_{AZ})] = 0$$

Hereinafter, a target elevation angle number $n_{EL}$ at which the signal power of the coherent-integration signal $R_{Tx,Rx,ch}(n_{EL}, n_{AZ}, q_{ntgt}, k_{ntgt})$ has the maximum value is a target elevation angle number $n_{EL,nTgt}$ indicating the elevation angle of a target candidate. In addition, description will be made with a target azimuth angle number $n_{AZ}$ at which the signal power of the coherent-integration signal $R_{Tx,Rx,ch}(n_{EL}, n_{AZ}, q_{ntgt}, k_{ntgt})$ has the maximum value being a target azimuth angle number $n_{AZ,nTgt}$ indicating the azimuth angle of the target candidate.

In the radar device 1 shown in FIG. 1, the receiving unit 12 includes the reception antennas 31-1 to 31-$N_{Rx}$.

When $N_{Rx}$=4, as shown in FIG. 9, the reception antennas 31-1 to 31-4 are arranged in a direction parallel to the x-axis, and a plurality of reception antennas are not arranged in a direction parallel to the z-axis.

In the antenna arrangement shown in FIG. 9, the transmission antennas 24-1 to 24-2 are arranged in the direction parallel to the x-axis and arranged on both sides of the reception antennas 31-1 to 31-4. As shown in FIG. 10, virtual array antennas are formed at a location shifted in an x-direction by a length $d_{Tx,\ sub,\ nTx}$ between the transmission antenna 24-1 and the transmission antenna 24-2, with the reception antenna 31-1 being the origin. In FIG. 10, $n_{Tx}$=1 and $d_{Tx,\ sub,\ 1}$=7.5 $d_{Rx}$.

The length $d_{Tx,\ sub,\ nTx}$ between the transmission antenna 24-1 and the transmission antenna 24-2 is represented as shown in the following expression (27):

$$d_{Tx,sub,n_{Tx}} = N_{Tx,sub,n_{Tx}} d_{Rx} + n_{Tx}\Delta d_{N_{Tx}} = N_{Tx,sub,n_{Tx}} d_{Rx} + n_{Tx}\frac{d_{Rx}}{N_{Tx}} \quad (27)$$

$$(n_{Tx} = 1, \ldots, N_{Tx} - 1)$$

In expression (27), $N_{Tx}$, sub, $n_{Tx}$ is any integer for setting a spacing between a transmission antenna with a transmission antenna number $n_{Tx-1}$ and a transmission antenna with a transmission antenna number $n_{Tx}$, and $\Delta d_{NTx}$ is a factor of a spacing between transmission antennas, the number of which is $N_{Tx}$.

A plurality of virtual reception antennas included in the virtual array antennas are not reception antennas that actually exist. However, the plurality of virtual reception antennas can obtain, by signal processing, reflected RF signals corresponding to reflected RF signals received by the reception antennas 31-1 to 31-4 that actually exist.

The angle calculating unit 46 calculates an azimuth angle $\theta(n_{AZ},\ n_{Tgt})$ of the target candidate indicated by the target azimuth angle number $n_{AZ,\ nTgt}$, on the basis of the signal strength of the coherent-integration signal $R_{Tx,\ Rx,\ ch}(n_{EL},\ n_{AZ},\ q_{ntgt},\ k_{ntgt})$ outputted from the coherent integration unit 45 (step ST3 of FIG. 5 and step ST36 of FIG. 8).

In addition, the angle calculating unit 46 calculates an elevation angle $\theta(n_{EL},\ n_{Tgt})$ of the target candidate indicated by the target elevation angle number $n_{EL}$, $n_{Tgt}$, on the basis of the signal strength of the coherent-integration signal $R_{Tx,\ Rx,\ ch}(n_{EL},\ n_{AZ},\ q_{ntgt},\ k_{ntgt})$ (step ST3 of FIG. 5 and step ST36 of FIG. 8).

A process itself of calculating each of the azimuth angle $\theta(n_{AZ},\ n_{Tgt})$ of the target candidate and the elevation angle $\theta(n_{EL},\ n_{Tgt})$ of the target candidate on the basis of the signal strength of the coherent-integration signal $R_{Tx,\ Rx,\ ch}(n_{EL},\ n_{AZ},\ q_{ntgt},\ k_{ntgt})$ is a publicly known technique and thus a detailed description thereof is omitted.

The angle calculating unit 46 outputs each of the azimuth angle $\theta(n_{AZ},\ n_{Tgt})$ of the target candidate and the elevation angle $\theta(n_{EL},\ n_{Tgt})$ of the target candidate to the display unit 14.

The display unit 14 displays each of the distance $L(n_{Tgt})$ to the target candidate and the speed $v(n_{Tgt})$ of the target candidate which are outputted from the target candidate detecting unit 44 on the display.

In addition, the display unit 14 displays each of the azimuth angle $\theta(n_{AZ},\ n_{Tgt})$ of the target candidate and the elevation angle $\theta(n_{EL},\ n_{Tgt})$ of the target candidate which are outputted from the angle calculating unit 46 on the display.

The usefulness of the radar device 1 shown in FIG. 1 will be described below.

Figure 13A:
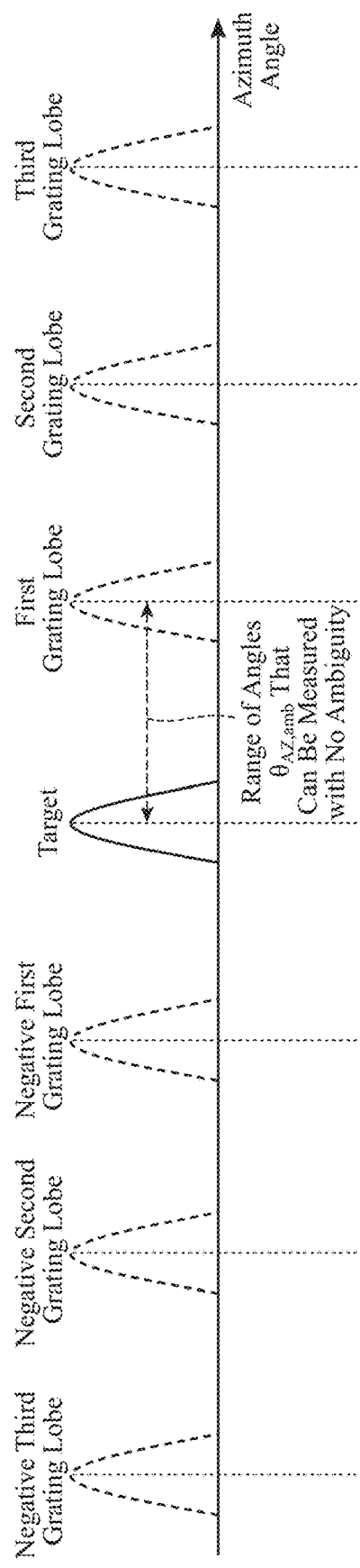
FIG. 13A is an explanatory diagram showing a coherent-integration signal obtained when virtual array antennas are formed in an antenna arrangement shown in FIG. 14.
Figure 14:
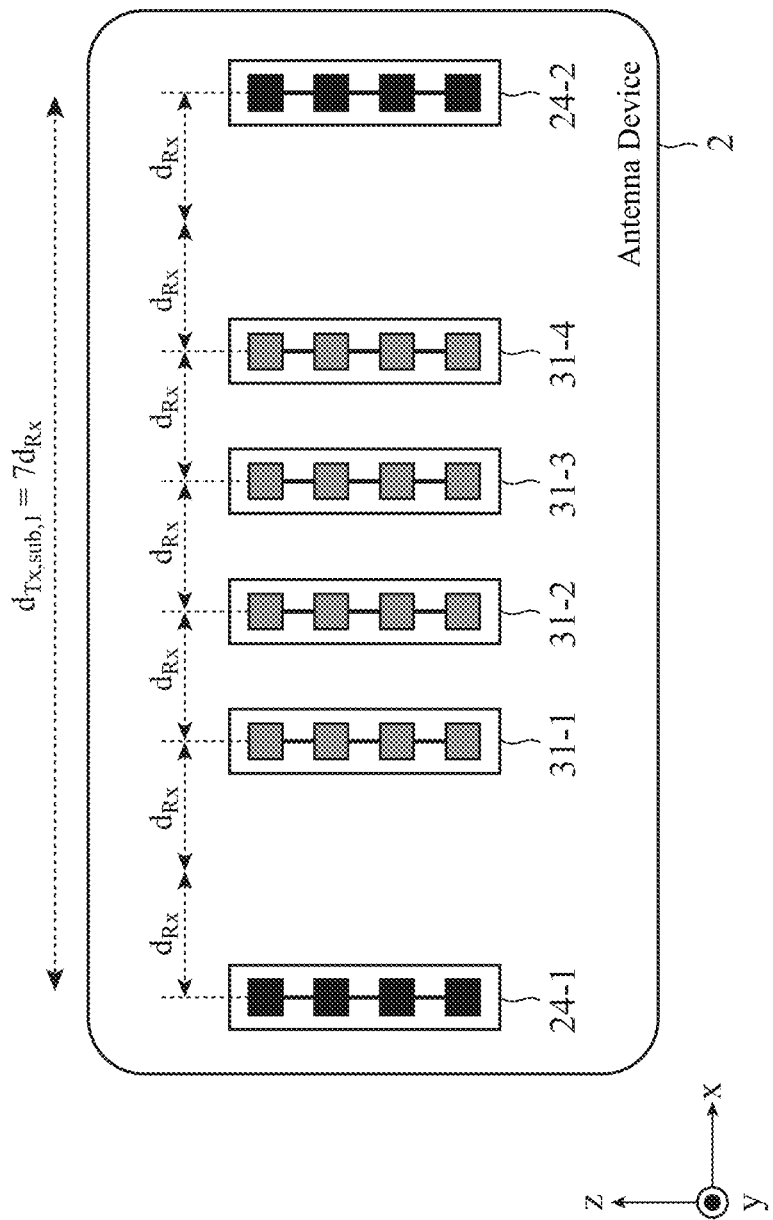
FIG. 14 is an explanatory diagram showing an exemplary arrangement of the transmission antennas 24-1 to 24-2 and the reception antennas 31-1 to 31-4.

FIG. 13A is an explanatory diagram showing a coherent-integration signal obtained when virtual array antennas are formed when the transmission antennas 24-1 to 24-2 are arranged in an antenna arrangement shown in FIG. 14.

FIG. 14 is an explanatory diagram showing an exemplary arrangement of the transmission antennas 24-1 to 24-2 and the reception antennas 31-1 to 31-4. In the exemplary arrangement of FIG. 14, the transmission antenna 24-2 is disposed at a location where a spacing between the transmission antenna 24-1 and the transmission antenna 24-2 is seven times the spacing $d_{RX}$ between each two of the reception antennas 31-1 to 31-4.

Figure 13B:
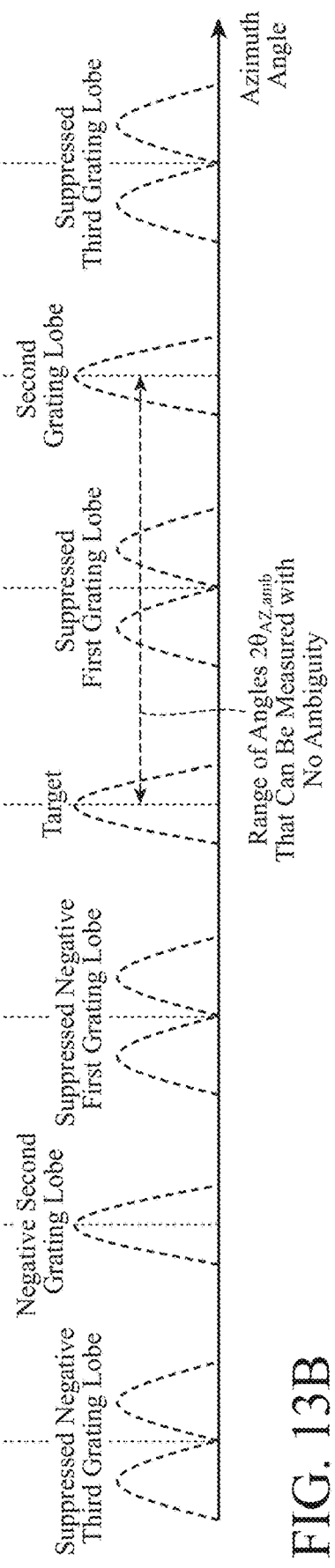
FIG. 13B is an explanatory diagram showing a coherent-integration signal obtained when virtual array antennas are formed in the antenna arrangement shown in FIG. 9.

FIG. 13B is an explanatory diagram showing a coherent-integration signal obtained when virtual array antennas are formed in the antenna arrangement shown in FIG. 9.

In the exemplary arrangement of FIG. 14, the spacing between the transmission antenna 24-1 and the transmission antenna 24-2 is an integral multiple of the spacing $d_{Rx}$ between each two of the reception antennas 31-1 to 31-4, and thus, an effect of suppressing a grating lobe level cannot be obtained. Since the effect of suppressing the grating lobe level cannot be obtained, grating lobes occur in the coherent-integration signal shown in FIG. 13A for each angle $\theta_{AZ,\ amb}$ that can be measured with no ambiguity and that is represented by the following expression (28):

$$\theta_{AZ,sub} = \sin^{-1}\left(\frac{c}{f_0 d_{Rx}}\right) \quad (28)$$

In the radar device 1 shown in FIG. 1, a spacing between actual array antennas and virtual array antennas has a width obtained by adding an integral multiple of the spacing $d_{RX}$ between each two of the reception antennas 31-1 to 31-$N_{RX}$ to a width $d_{RX}/N_{TX}$ obtained by dividing the spacing $d_{RX}$ by the number $N_{TX}$ of the transmission antennas. Hence, in the antenna arrangement shown in FIG. 9, an angle at which a reflected RF signal $Rx_0(1,\ n_{Rx},\ h,\ t)$ corresponding to a transmission RF signal $Tx_1(1,\ h,\ t)$ radiated from the transmission antenna 24-1 is orthogonal to a reflected RF signal $Rx_0(2,\ n_{Rx},\ h,\ t)$ corresponding to a transmission RF signal $Tx_1(2,\ h,\ t)$ radiated from the transmission antenna 24-2 can be formed, and the effect of suppressing the grating lobe level can be obtained.

Thus, in the coherent-integration signal shown in FIG. 13B, a grating lobe is suppressed by the number $N_{Tx}$-1 of the transmission antennas. Specifically, in the antenna arrangement shown in FIG. 9, since $N_{TX}$=2, one grating lobe is suppressed in the coherent-integration signal shown in FIG. 13B. A first grating lobe and a third grating lobe which are shown in FIG. 13B are repetition of one grating lobe. Hence, the first grating lobe and the third grating lobe are suppressed as one grating lobe.

Though description is omitted in FIG. 13B, a fifth grating lobe, a seventh grating lobe, a ninth grating lobe, . . . , are also repetition of one grating lobe, and thus, are suppressed as with the first grating lobe and the third grating lobe. In addition, a negative first grating lobe, a negative third grating lobe, a negative fifth grating lobe, . . . , are also likewise suppressed.

In the antenna arrangement shown in FIG. 9, by the suppression of the first grating lobe and the third grating lobe, the angle that can be measured with no ambiguity is 2 $\theta_{AZ,\ amb}$. In the antenna arrangement shown in FIG. 14, the angle that can be measured with no ambiguity is $\theta_{AZ, amb}$, and in the antenna arrangement shown in FIG. 9, the angle that can be measured with no ambiguity is increased over the antenna arrangement shown in FIG. 14.

In the antenna arrangement shown in FIG. 9, two transmission antennas 24-1 to 24-2 are arranged. However, this is merely an example, and three or more transmission antennas 24-1 to 24-$N_{TX}$ may be arranged.

Figure 15:
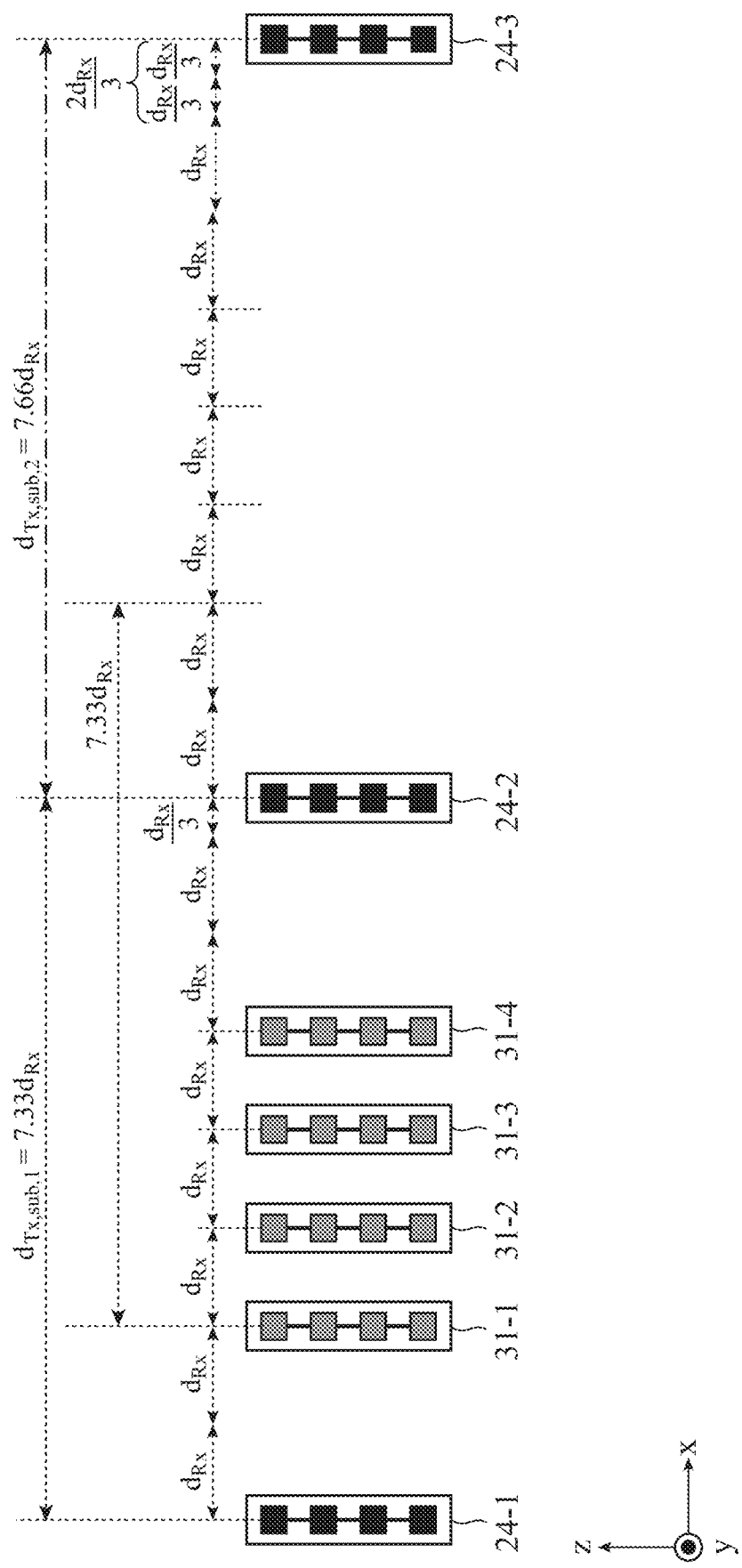
FIG. 15 is an explanatory diagram showing an exemplary arrangement of the transmission antennas 24-1 to 24-3 and the reception antennas 31-1 to 31-4 in the antenna device 2.

FIG. 15 is an explanatory diagram showing an exemplary arrangement of transmission antennas 24-1 to 24-3 and the reception antennas 31-1 to 31-4 in the antenna device 2.

Figure 16:
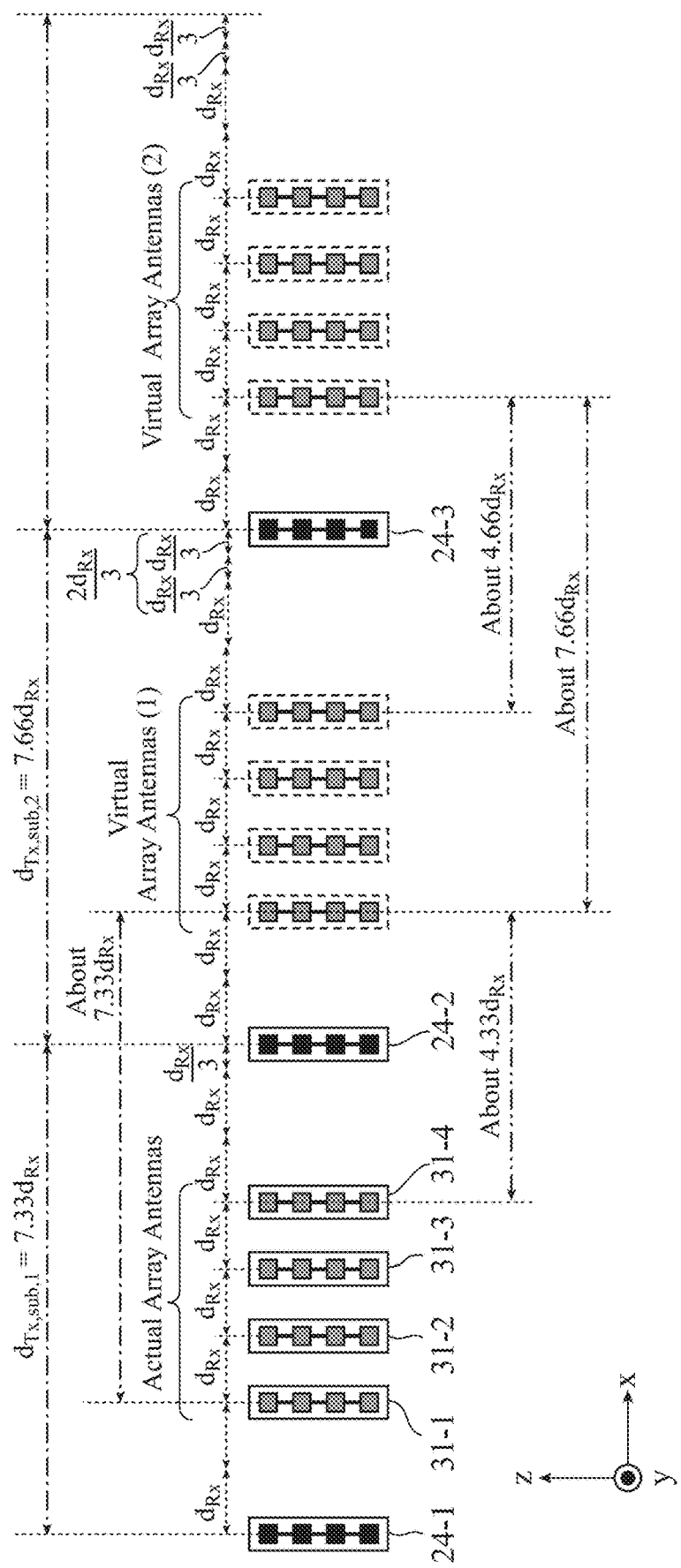
FIG. 16 is an explanatory diagram showing a relationship between actual array antennas and virtual array antennas.

FIG. 16 is an explanatory diagram showing a relationship between actual array antennas and virtual array antennas.

The reception antennas 31-1 to 31-4 are actual array antennas.

The transmission antennas 24-1 to 24-3 and the reception antennas 31-1 to 31-4 are arranged in a row in the direction parallel to the x-axis. In addition, the reception antennas 31-1 to 31-4 are arranged between the transmission antenna 24-1 and the transmission antenna 24-2 which are adjacent to each other among the transmission antennas 24-1 to 24-3. Virtual array antennas (1) and (2) are formed in the same row as the reception antennas 31-1 to 31-4.

A spacing between the transmission antenna 24-1 and the transmission antenna 24-2 and a spacing between the transmission antenna 24-2 and the transmission antenna 24-3 differ from each other.

The spacing between the transmission antenna 24-1 and the transmission antenna 24-2 has a width obtained by adding an integral multiple (1) of the spacing $d_{RX}$ between each two of the reception antennas 31-1 to 31-4 to an integral multiple (2) of a width $d_{RX}/N_{TX}$ obtained by dividing the spacing $d_{RX}$ between each two of the reception antennas 31-1 to 31-4 by the number $N_{TX}$ of the transmission antennas 24-1 to 24-3. In an example of FIG. 15, the integral multiple (1)=7, $N_{TX}$=3, and the integral multiple (2)=$N_{TX}$−2=1, and the spacing between the transmission antenna 24-1 and the transmission antenna 24-2 is 7.33 $d_{RX}$ (=7$d_{RX}$+1×$d_{RX}$/3).

The spacing between the transmission antenna 24-2 and the transmission antenna 24-3 has a width obtained by adding an integral multiple (3) of the spacing $d_{RX}$ between each two of the reception antennas 31-1 to 31-4 to an integral multiple (4) of a width $d_{RX}/N_{TX}$ obtained by dividing the spacing $d_{RX}$ between each two of the reception antennas 31-1 to 31-4 by the number $N_{TX}$ of the transmission antennas 24-1 to 24-3. In the example of FIG. 15, the integral multiple (3)=7, $N_{TX}$=3, and the integral multiple (4)=$N_{TX}$−1=2, and the spacing between the transmission antenna 24-2 and the transmission antenna 24-3 is 7.66 $d_{RX}$ (=7$d_{RX}$+2×$d_{RX}$/3).

In the example of FIG. 15, the integral multiple (3)=7. However, this is merely an example, and the integral multiple (3) may be an integer less than or equal to 6 or may be an integer greater than or equal to 8.

A spacing between the actual array antennas and the virtual array antennas (1) has a width obtained by adding an integral multiple of the spacing $d_{RX}$ between each two of the reception antennas 31-1 to 31-4 to a width $d_{RX}/N_{TX}$ obtained by dividing the spacing $d_{RX}$ between each two of the reception antennas 31-1 to 31-4 by the number $N_{TX}$ of the transmission antennas 24-1 to 24-3.

In an example of FIG. 16, the integral multiple=4, $N_{TX}$=3, and the spacing between the actual array antennas and the virtual array antennas (1) is about 4.33 $d_{RX}$.

A spacing between the virtual array antennas (1) and the virtual array antennas (2) has a width obtained by adding an integral multiple of the spacing $d_{RX}$ between each two of the reception antennas 31-1 to 31-4 to 2 times of a width $d_{RX}/N_{TX}$ obtained by dividing the spacing $d_{RX}$ between each two of the reception antennas 31-1 to 31-4 by the number $N_{TX}$ of the transmission antennas 24-1 to 24-3.

In the example of FIG. 16, the integral multiple=4, $N_{TX}$=3, and the spacing between the virtual array antennas (1) and the virtual array antennas (2) is about 4.66 $d_{RX}$.

Figure 18:
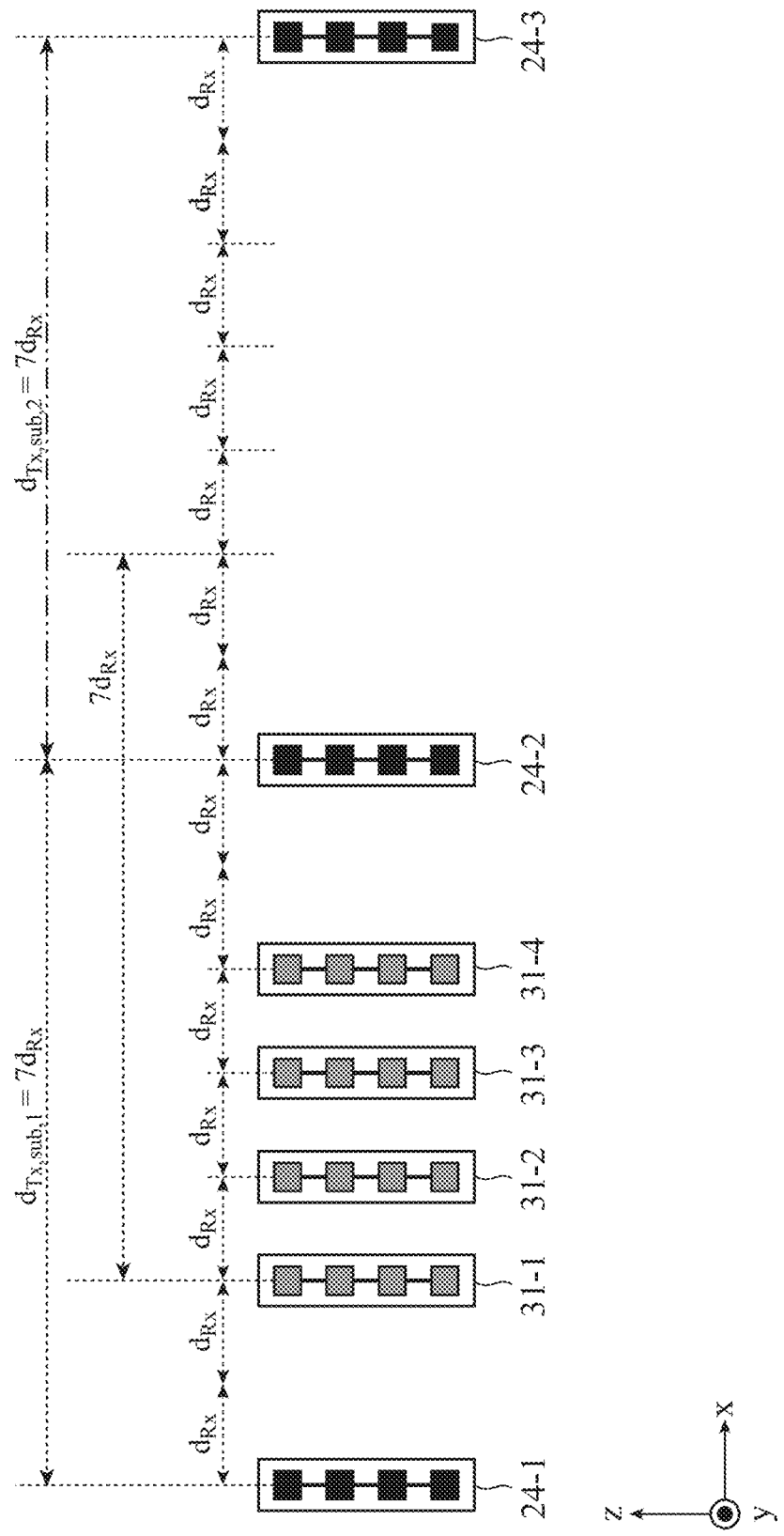
FIG. 18 is an explanatory diagram showing an exemplary arrangement of the transmission antennas 24-1 to 24-3 and the reception antennas 31-1 to 31-4.

FIG. 17A is an explanatory diagram showing a coherent-integration signal obtained when virtual array antennas are formed when the transmission antennas 24-1 to 24-3 are arranged in an antenna arrangement shown in FIG. 18.

FIG. 18 is an explanatory diagram showing an exemplary arrangement of the transmission antennas 24-1 to 24-3 and the reception antennas 31-1 to 31-4. In the exemplary arrangement of FIG. 18, the transmission antenna 24-2 is disposed at a location where a spacing between the reception antenna 31-4 and the transmission antenna 24-2 is twice the spacing $d_{RX}$ between each two of the reception antennas 31-1 to 31-4.

In addition, the transmission antenna 24-2 and the transmission antenna 24-3 are arranged at the same spacing as the spacing between the transmission antenna 24-1 and the transmission antenna 24-2.

FIG. 17B is an explanatory diagram showing a coherent-integration signal obtained when virtual array antennas are formed in the antenna arrangement shown in FIG. 15.

In the exemplary arrangement of FIG. 18, each of the spacings between each two of the transmission antennas 24-1 to 24-3 is an integral multiple of the spacing $d_{RX}$ between each two of the reception antennas 31-1 to 31-4, and thus, the effect of suppressing the grating lobe level cannot be obtained. Since the effect of suppressing the grating lobe level cannot be obtained, grating lobes occur in the coherent-integration signal shown in FIG. 17A for each angle $\theta_{AZ, amb}$ that can be measured with no ambiguity and that is represented by expression (28).

In the radar device 1 shown in FIG. 1, the spacing between the actual array antennas and the virtual array antennas has a width obtained by adding an integral multiple of the spacing $d_{RX}$ between each two of the reception antennas 31-1 to 31-$N_{RX}$ to a width $d_{RX}/N_{TX}$ obtained by dividing the spacing $d_{RX}$ by the number $N_{TX}$ of the transmission antennas. Hence, in the antenna arrangement shown in FIG. 15, as with the antenna arrangement shown in FIG. 9, the effect of suppressing the grating lobe level can be obtained.

Thus, in the coherent-integration signal shown in FIG. 17B, grating lobes are suppressed by the number $N_{TX}$−1 of the transmission antennas. Specifically, in the antenna arrangement shown in FIG. 15, since $N_{TX}$=3, a first grating lobe and a second grating lobe are suppressed as two grating lobes in the coherent-integration signal shown in FIG. 17B.

Though description is omitted in FIG. 17B, a fourth grating lobe, a seventh grating lobe, a tenth grating lobe, . . . , are repetition of the same grating lobe as the first grating lobe, and thus, are suppressed as with the first grating lobe.

In addition, a fifth grating lobe, an eighth grating lobe, an eleventh grating lobe, . . . , are repetition of the same grating lobe as the second grating lobe, and thus, are suppressed as with the second grating lobe.

In addition, a negative first grating lobe, a negative second grating lobe, a negative fourth grating lobe, a negative fifth grating lobe, . . . , are also likewise suppressed.

In the antenna arrangement shown in FIG. 15, by the suppression of the first grating lobe and the second grating lobe, the angle that can be measured with no ambiguity is 3 $\theta_{AZ, amb}$. In the antenna arrangement shown in FIG. 18, the angle that can be measured with no ambiguity is $\theta_{AZ,\ amb}$, and in the antenna arrangement shown in FIG. 15, the angle that can be measured with no ambiguity is increased over the antenna arrangement shown in FIG. 18.

In the above-described first embodiment, the antenna device 2 is formed in such a manner that the reception antennas 31-1 to 31-$N_{Rx}$ are arranged at regular intervals between the transmission antenna 24-1 and the transmission antenna 24-2 which are adjacent to each other among the transmission antennas 24-1 to 24-$N_{Tx}$, and a spacing between the transmission antenna 24-1 and the transmission antenna 24-2 has a width obtained by adding an integral multiple of the spacing $d_{Rx}$ between each two of the reception antennas 31-1 to 31-$N_{Rx}$ to a width obtained by dividing the spacing $d_{Rx}$ by the number $N_{TX}$ of the transmission antennas 24-1 to 24-$N_{Tx}$. Thus, the antenna device 2 can suppress occurrence of grating lobes.

In the antenna arrangements shown in FIGS. 9 and 15, since the reception antennas 31-1 to 31-4 are arranged between the transmission antenna 24-1 and the transmission antenna 24-2, the antenna module size in the direction parallel to the z-axis can be reduced.

In the antenna arrangements shown in FIGS. 9 and 15, the spacing between the transmission antenna 24-1 and the reception antenna 31-1 is wider than the spacing $d_{Rx}$ between each two of the reception antennas 31-1 to 31-4, and the spacing between the transmission antenna 24-2 and the reception antenna 31-4 is wider than the spacing $d_{Rx}$ between each two of the reception antennas 31-1 to 31-4. Thus, the influence of leakage of transmission RF signals which are radiated from the transmission antennas 24-1 to 24-2 and directly received by the reception antennas 31-1 to 31-4 can be reduced.

In the radar device 1 shown in FIG. 1, the code modulating unit 22 generates a transmission RF signal $Tx_1(n_{Tx}, h, t)$ for a transmission channel corresponding to a transmission channel number $n_{Tx}$ by multiplying a local oscillation signal $L_1(h, t)$ by a modulation code $Code_1(n_{Tx}, h)$.

The code modulating unit 22 may generate the transmission RF signal $Tx_1(n_{Tx}, h, t)$ by a method other than the multiplication of the local oscillation signal $L_1(h, t)$ by the modulation code $Code_1(n_{Tx}, h)$, as long as transmission RF signals radiated from the respective transmission antennas 24-1 to 24-$N_{TX}$ can be made different from each other.

The code modulating unit 22 may generate the transmission RF signal $Tx_1(n_{Tx}, h, t)$, for example, by performing any of time division, code division, and frequency division on the local oscillation signal $L_1(h, t)$.

In addition, the code modulating unit 22 may generate the transmission RF signal $Tx_1(n_{Tx}, h, t)$, for example, by performing both time division and code division or both frequency division and code division on the local oscillation signal $L_1(h, t)$.

Second Embodiment

In the radar device 1 shown in FIG. 1, the coherent integration unit 45 coherently integrates a distance and speed signal $f_{b,\ 1}(n_{Tx}, n_{Rx}, q_{ntgt}, k_{ntgt})$, thereby obtaining a coherent-integration signal $R_{Tx,\ Rx,\ ch}(n_{EL}, n_{AZ}, q_{ntgt}, k_{ntgt})$ such as that shown in expression (22).

In a second embodiment, a radar device 1 will be described in which a coherent integration unit 48 coherently integrates a distance and speed signal $f_{b,\ 1}(n_{Tx}, n_{Rx}, q_{ntgt}, k_{ntgt})$ by performing a fast Fourier transform (FFT) on the distance and speed signal $f_{b,\ 1}(mx, n_{Rx}, q_{ntgt}, k_{ntgt})$ for each of an azimuth direction and an elevation direction.

Figure 19:
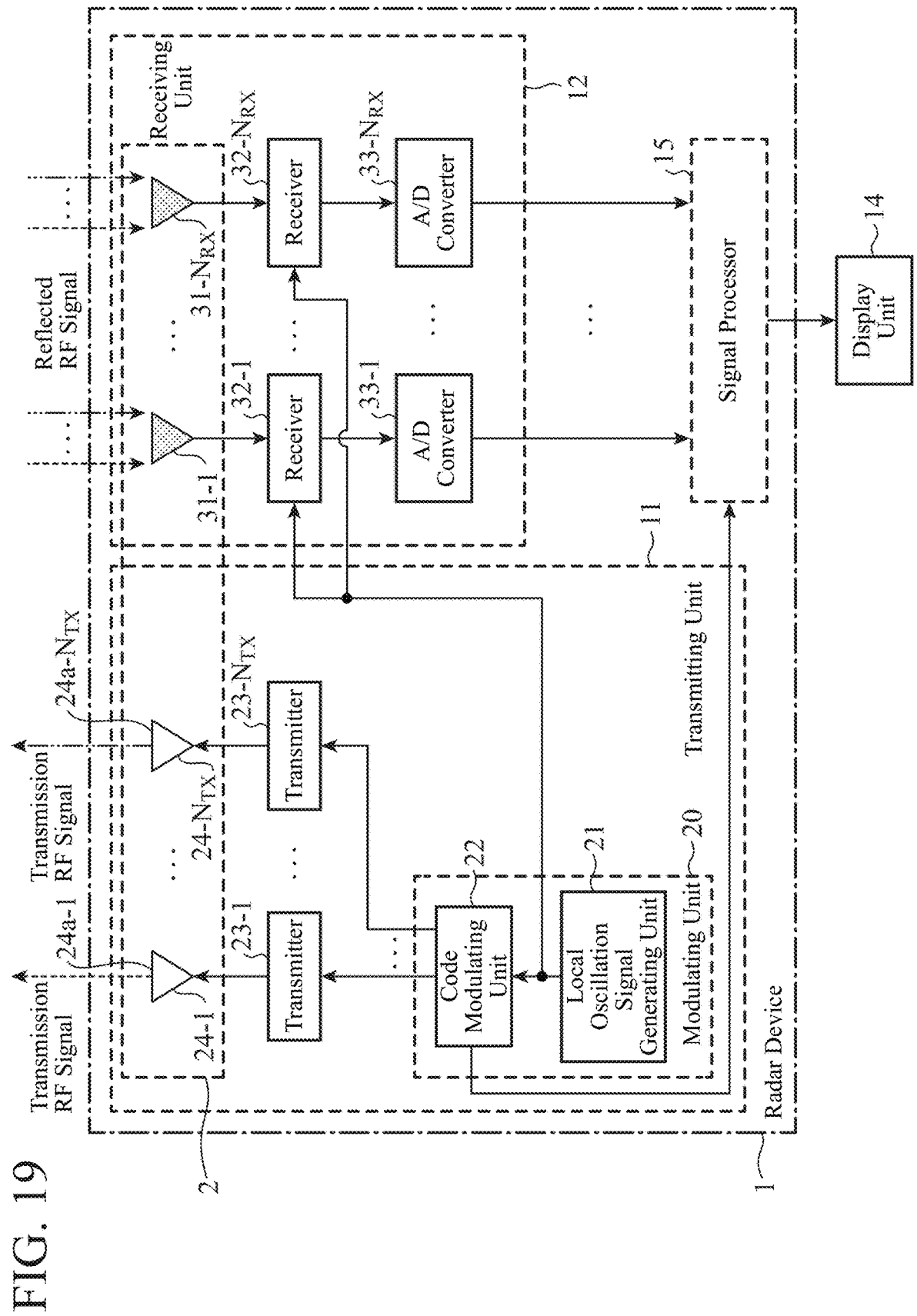
FIG. 19 is a configuration diagram showing a radar device 1 according to a second embodiment.

FIG. 19 is a configuration diagram showing the radar device 1 according to the second embodiment.

Figure 20:
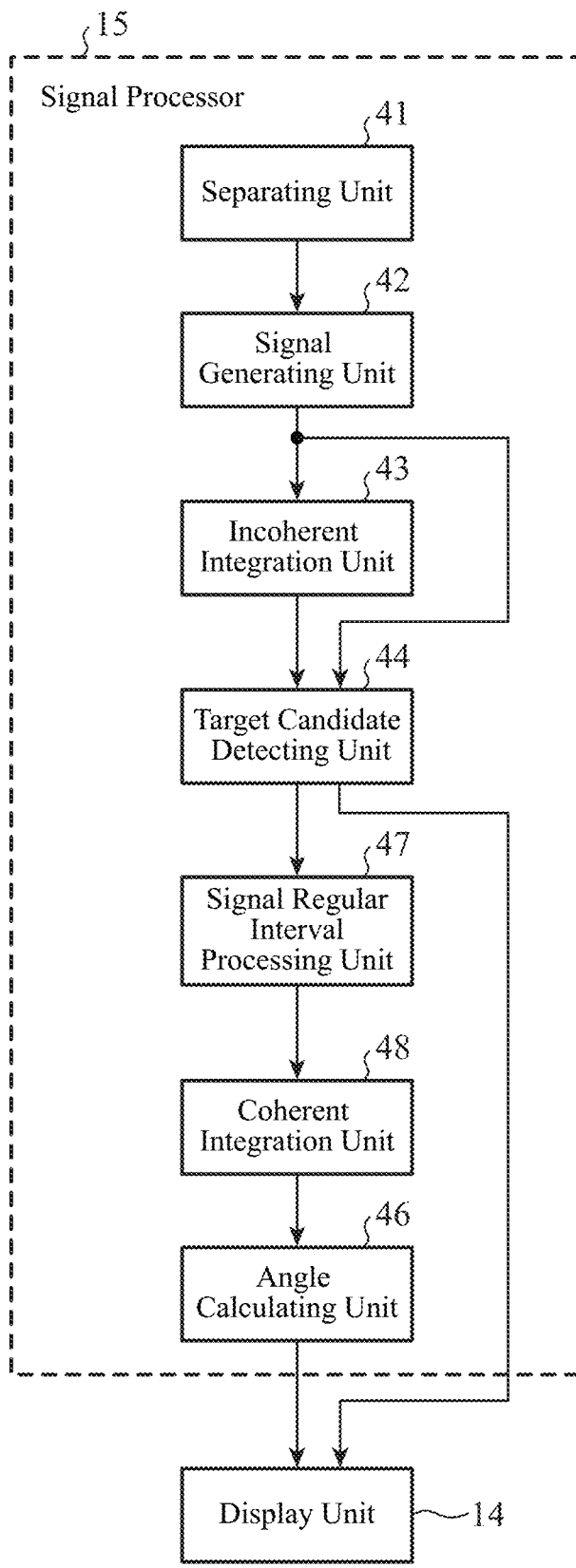
FIG. 20 is a configuration diagram showing a signal processor 15 in the radar device 1 according to the second embodiment.

FIG. 20 is a configuration diagram showing a signal processor 15 in the radar device 1 according to the second embodiment.

Figure 21:
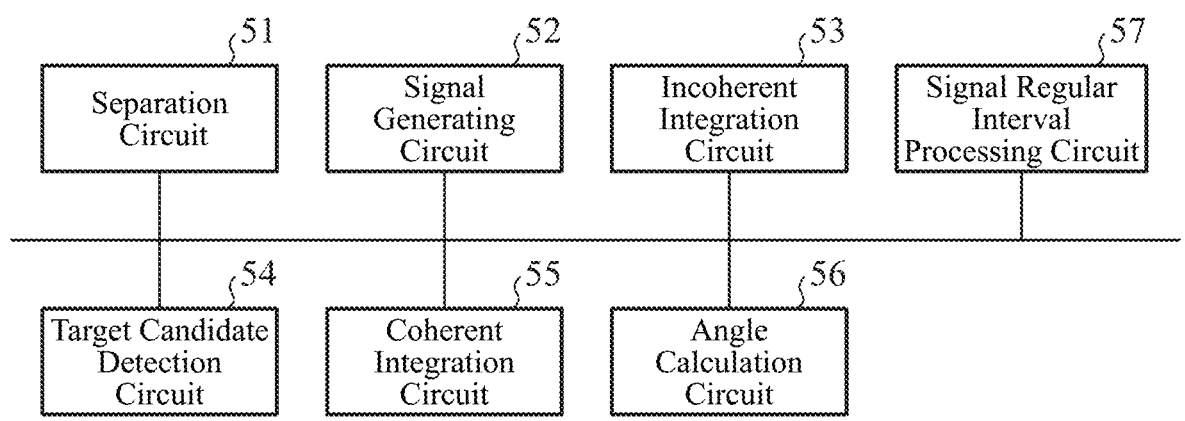
FIG. 21 is a hardware configuration diagram showing hardware of the signal processor 15.

FIG. 21 is a hardware configuration diagram showing hardware of the signal processor 15.

In FIGS. 19 to 21, the same reference signs as those of FIGS. 1 to 3 indicate the same or corresponding components and thus description thereof is omitted.

In FIG. 19, the radar device 1 includes the transmitting unit 11, the receiving unit 12, and the signal processor 15.

The signal processor 15 includes, as shown in FIG. 20, the separating unit 41, the signal generating unit 42, the incoherent integration unit 43, the target candidate detecting unit 44, a signal regular interval processing unit 47, the coherent integration unit 48, and the angle calculating unit 46.

As with the signal processor 13 shown in FIG. 1, the signal processor 15 generates a plurality of distance and speed signals including each of distance information about the distance to a target and speed information about the speed of the target.

The signal processor 15 performs a signal regular interval process that converts the plurality of distance and speed signals into signals having regular signal intervals.

The signal processor 15 performs an FFT on the plurality of distance and speed signals having been subjected to the signal regular interval process, thereby coherently integrating the plurality of distance and speed signals having been subjected to the signal regular interval process, and measures the angle of the target from a coherent-integration signal which is a result of the coherent integration of the plurality of distance and speed signals having been subjected to the signal regular interval process.

As in the first embodiment, the target candidate detecting unit 44 detects a target candidate on the basis of the signal strength of an incoherent-integration signal outputted from the incoherent integration unit 43.

As in the first embodiment, the target candidate detecting unit 44 calculates each of the distance to the detected target candidate and the speed of the target candidate.

The target candidate detecting unit 44 outputs each of the distance to the target candidate and the speed of the target candidate to the display unit 14.

The target candidate detecting unit 44 outputs distance and speed signals corresponding to the target candidate that is detected on the basis of the signal strength of the incoherent-integration signal among a plurality of distance and speed signals outputted from the signal generating unit 42, to the signal regular interval processing unit 47.

The signal regular interval processing unit 47 is implemented by, for example, a signal regular interval processing circuit 57 shown in FIG. 21.

The signal regular interval processing unit 47 performs a signal regular interval process that converts the plurality of distance and speed signals outputted from the target candidate detecting unit 44 into signals having regular signal intervals.

The signal regular interval processing unit 47 outputs the plurality of distance and speed signals having been subjected to the signal regular interval process to the coherent integration unit 48.

The coherent integration unit 48 is implemented by, for example, a coherent integration circuit 58 shown in FIG. 21.

The coherent integration unit 48 performs an FFT on the plurality of distance and speed signals having been subjected to the signal regular interval process which are outputted from the signal regular interval processing unit 47, thereby coherently integrating the plurality of distance and speed signals having been subjected to the signal regular interval process.

The coherent integration unit 48 outputs a coherent-integration signal which is a result of the coherent integration of the plurality of distance and speed signals having been subjected to the signal regular interval process, to the angle calculating unit 46.

In FIG. 20, it is assumed that each of the separating unit 41, the signal generating unit 42, the incoherent integration unit 43, the target candidate detecting unit 44, the signal regular interval processing unit 47, the coherent integration unit 48, and the angle calculating unit 46 which are the components of the signal processor 15 is implemented by dedicated hardware such as that shown in FIG. 21. Namely, it is assumed that the signal processor 15 is implemented by the separation circuit 51, the signal generating circuit 52, the incoherent integration circuit 53, the target candidate detection circuit 54, the signal regular interval processing circuit 57, the coherent integration circuit 58, and the angle calculation circuit 56.

Here, each of the separation circuit 51, the signal generating circuit 52, the incoherent integration circuit 53, the target candidate detection circuit 54, the signal regular interval processing circuit 57, the coherent integration circuit 58, and the angle calculation circuit 56 corresponds, for example, to a single circuit, a composite circuit, a programmed processor, a parallel programmed processor, an ASIC, an FPGA, or a combination thereof.

The components of the signal processor 15 are not limited to those implemented by dedicated hardware, and the signal processor 15 may be implemented by software, firmware, or a combination of software and firmware.

When the signal processor 15 is implemented by software, firmware, or the like, a program for causing a computer to perform processing procedures performed by the separating unit 41, the signal generating unit 42, the incoherent integration unit 43, the target candidate detecting unit 44, the signal regular interval processing unit 47, the coherent integration unit 48, and the angle calculating unit 46 is stored in the memory 61 shown in FIG. 4. Then, the processor 62 shown in FIG. 4 executes the program stored in the memory 61.

In addition, FIG. 21 shows an example in which each of the components of the signal processor 15 is implemented by dedicated hardware, and FIG. 4 shows an example in which the signal processor 15 is implemented by software, firmware, or the like. However, they are merely examples, and some of the components of the signal processor 15 may be implemented by dedicated hardware and the other components may be implemented by software, firmware, or the like.

Next, the operations of the radar device 1 shown in FIG. 19 will be described.

Note that all components of the signal processor 15 other than the signal regular interval processing unit 47 and the coherent integration unit 48 are the same as those in the radar device 1 shown in FIG. 1, and thus, here, the operations of the signal regular interval processing unit 47 and the coherent integration unit 48 will be mainly described.

In the antenna arrangements shown in FIGS. 9 and 15, each of the spacings $d_{Tx,\,sub,\,nTx}$ between each two of the transmission antennas 24-1 to 24-$N_{Tx}$ is not an integral multiple of the spacing $d_{Rx}$ between each two of the reception antennas 31-1 to 31-$N_{Rx}$.

Since the spacing $d_{Tx,\,sub,\,nTx}$ is not an integral multiple of the spacing $d_{Rx}$, an FFT cannot be performed on a distance and speed signal $f_{b,\,1}(n_{Tx}, n_{Rx}, q_{ntgt}, k_{ntgt})$ with a transmission antenna number $n_{Tx}$ and a reception antenna number $n_{Rx}$ which is outputted from the target candidate detecting unit 44.

Since the coherent integration unit 45 shown in FIG. 2 cannot perform an FFT on the distance and speed signal $f_{b,\,1}(n_{Tx}, n_{Rx}, q_{ntgt}, k_{ntgt})$, as shown in expression (22), the coherent integration unit 45 performs a discrete Fourier transform on the distance and speed signal $f_{b,\,1}(n_{Tx}, n_{Rx}, q_{ntgt}, k_{ntgt})$.

When the signal regular interval processing unit 47 receives a plurality of distance and speed signals $f_{b,\,1}(n_{Tx}, n_{Rx}, q_{ntgt}, k_{ntgt})$ from the target candidate detecting unit 44, the signal regular interval processing unit 47 performs a signal regular interval process on the plurality of distance and speed signals $f_{b,\,1}(n_{Tx}, n_{Rx}, q_{ntgt}, k_{ntgt})$.

The signal regular interval processing unit 47 outputs signals $f'_{d,\,1}(n'_{TxRx}, q_{ntgt}, k_{ntgt})$ shown in the following expression (29), as the plurality of distance and speed signals having been subjected to the signal regular interval process, to the coherent integration unit 48.

Figure 22:
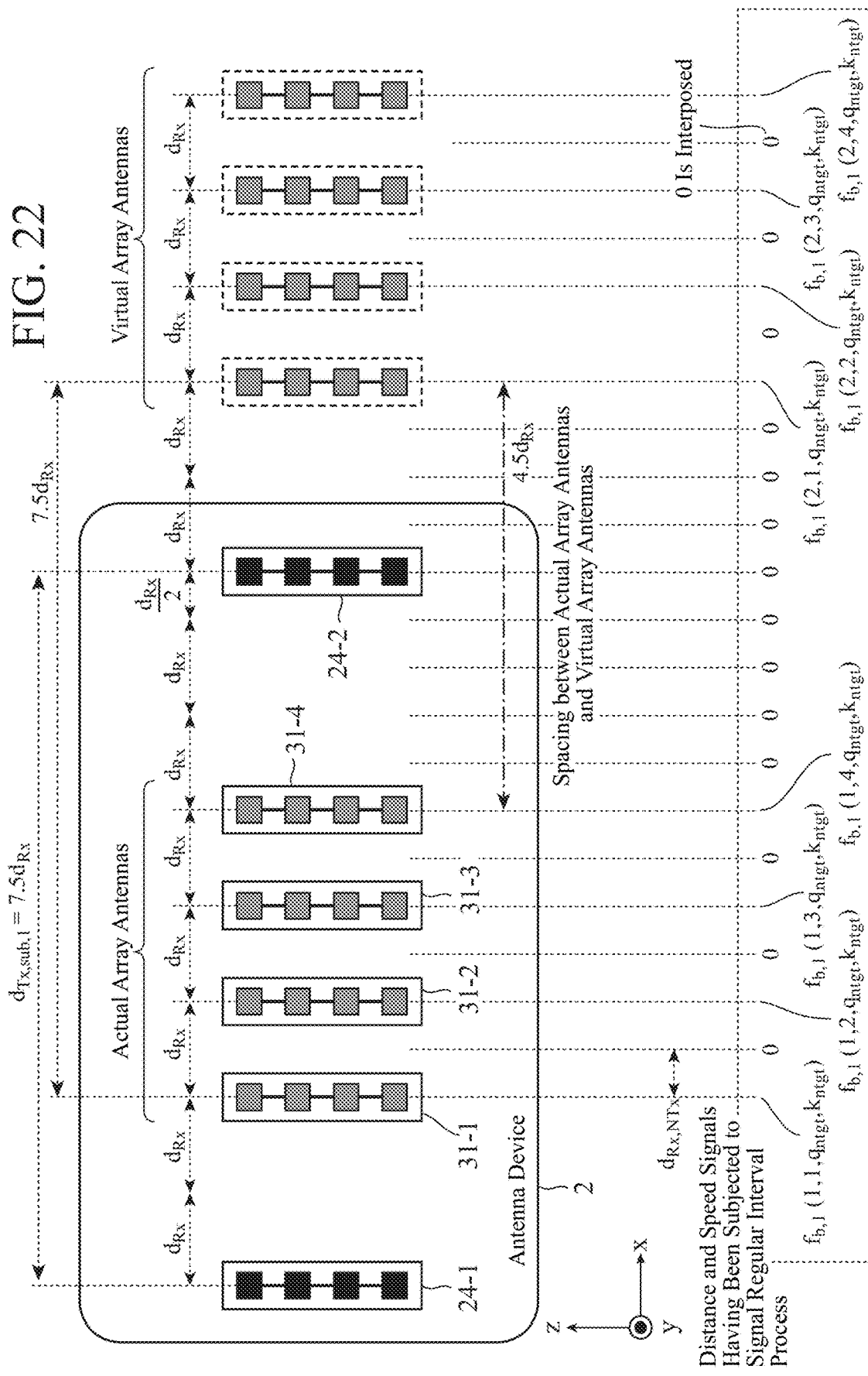
FIG. 22 is an explanatory diagram showing a plurality of distance and speed signals $f_{b,1}(n'_{TxRx}, q_{ntgt}, k_{ntgt})$ having been subjected to a signal regular interval process.

The plurality of distance and speed signals $f'_{d,\,1}(n'_{TxRx}, q_{ntgt}, k_{ntgt})$ having been subjected to the signal regular interval process are, as shown in FIG. 22, generated by interpolating "0" between the plurality of distance and speed signals $f_{b,\,1}(n_{Tx}, n_{Rx}, q_{ntgt}, k_{ntgt})$ outputted from the target candidate detecting unit 44.

FIG. 22 is an explanatory diagram showing the plurality of distance and speed signals $f'_{d,\,1}(n'_{TxRx}, q_{ntgt}, k_{ntgt})$ having been subjected to the signal regular interval process. The plurality of distance and speed signals $f'_{d,\,1}(n'_{TxRx}, q_{ntgt}, k_{ntgt})$ having been subjected to the signal regular interval process are signals on which an FFT can be performed.

(29)

$$f'_{d,1}(n'_{TxRx}, q_{n_{tgt}}, k_{n_{tgt}}) =$$

$$\begin{cases} f_{d,1}(n_{Tx}, n_{Rx}, q_{n_{tgt}}, k_{n_{tgt}}) = A\exp\left[-j2\pi f_0 \frac{2R_0}{c}\right]\exp(j\varphi'_{TxRx}(n'_{TxRx})), \\ n'_{TxRx} = \dfrac{\left[\sum_{n'_{Tx}=1}^{N_{Tx}} d_{Tx,sub,n'_{Tx}}\right] + n_{Rx}d_{Rx}}{\Delta d_{N_{Tx}}} \\ 0, \text{ otherwise} \end{cases}$$

$$(n_{tgt} = 0, 1, \ldots, N_{tgt} - 1)$$
$$(n_{Rx} = 0, 1, \ldots, N_{Rx} - 1)$$
$$(n_{Tx} = 0, 1, \ldots, N_{Tx} - 1)$$

In expression (29), $n'_{TxRx}$ is the sample number of the plurality of distance and speed signals $f'_{d,\,1}(n'_{TxRx}, q_{ntgt}, k_{ntgt})$ having been subjected to the signal regular interval process.

$N'_{TxRx}$ is the number of signal points of the plurality of distance and speed signals $f'_{d,\,1}(n'_{TxRx}, q_{ntgt}, k_{ntgt})$ having been subjected to the signal regular interval process, and is represented as shown in the following expression (30).

$(p'_{TxRx}(n'_{TxRx})$ is the incoming phase difference between the plurality of distance and speed signals $f'_{d,\,1}(n'_{TxRx}, q_{ntgt},$ $k_{ntgt}$) having been subjected to the signal regular interval process, and is represented as shown in the following expression (31).

$$N'_{TxRx} = \frac{\left[\sum_{n'_{Tx}=1}^{N_{Tx}} d_{Tx,sub,n'_{Tx}}\right] + N_{Rx}d_{Rx}}{\Delta d_{N_{Tx}}} \quad (30)$$

$$\varphi'_{TxRx}(n'_{TxRx}) = 2\pi f_0 \frac{n'_{TxRx}\Delta d_{N_{Tx}}\sin\theta_{AZ}}{c} \quad (31)$$

The coherent integration unit 48 performs an FFT for the azimuth direction on the plurality of distance and speed signals $f'_{d,1}(n'_{TxRx}, q_{ntgt}, k_{ntgt})$ having been subjected to the signal regular interval process which are outputted from the signal regular interval processing unit 47, thereby coherently integrating the plurality of distance and speed signals $f'_{d,1}(n'_{TxRx}, q_{ntgt}, k_{ntgt})$ having been subjected to the signal regular interval process.

The coherent integration unit 48 obtains a coherent-integration signal $R'_{Tx, Rx, ch}(n_{AZ}, q_{ntgt}, k_{ntgt})$ such as that shown in the following expression (32), as a result of the coherent integration of the plurality of distance and speed signals $f'_{d,1}(n'_{TxRx}, q_{ntgt}, k_{ntgt})$ having been subjected to the signal regular interval process.

The coherent integration unit 48 outputs the coherent-integration signal $R'_{Tx, Rx, ch}(n_{AZ}, q_{ntgt}, k_{ntgt})$ to the angle calculating unit 46.

$$R'_{Tx,Rx,ch}(n_{AZ}, q_{n_{tgt}}, K_{n_{tgt}}) = FFT[f'_{d,1}(n'_{TxRx}, q_{n_{tgt}}, k_{n_{tgt}})] = \quad (32)$$

$$\sum_{n'_{TxRx}=0}^{N'_{TxRx}-1} f'_{d,1}(n'_{TxRx}, q_{n_{tgt}}, k_{n_{tgt}}) \exp\left[-j2\pi \frac{n'_{TxRx}}{N_{AZ,fft}} n_{AZ}\right]$$

$(n_{tgt} = 0, 1, \ldots, N_{tgt} - 1)$ $(n_{AZ} = 0, 1, \ldots, N_{AZ,fft} - 1)$ In expression (32), FFT(X) indicates an FFT in the azimuth direction performed on a signal X, and $N_{AZ,fft}$ is the number of FFT points in the azimuth direction.

The signal power of the coherent-integration signal $R'_{Tx, Rx, ch}(n_{AZ}, q_{ntgt}, k_{ntgt})$ shown in expression (32) has a maximum value when, as shown in expression (26), a difference between a phase difference $\varphi_{Tx}(n_{Tx})$ and a phase difference $\varphi'_{Rx}(n_{Rx}, n_{EL}, n_{AZ})$ for a transmission channel is zero and a difference between a phase difference $\varphi_{Rx}(n_{Rx})$ and a phase difference $\varphi'_{Tx}(n_{Tx}, n_{EL}, n_{AZ})$ for a reception channel is zero.

On the basis of the coherent-integration signal $R'_{Tx, Rx, ch}(n_{AZ}, q_{ntgt}, k_{ntgt})$ obtained when the signal power has the maximum value, the azimuth angle $\theta(n_{AZ}, n_{Tgt})$ of a target candidate with a target candidate number $n_{tgt}$ is represented as shown in the following expression (33):

$$\frac{n_{AZ}}{N_{AZ,fft}} = f_0 \frac{\Delta d_{N_{Tx}}\sin\theta_{AZ}}{c} \therefore \theta(n_{AZ,n_{Tgt}}) = \sin^{-1}\left(\frac{n_{AZ,n_{Tgt}}}{N_{AZ,fft}} \frac{c}{f_0 \Delta d_{N_{Tx}}}\right) \quad (33)$$

Figure 23A:
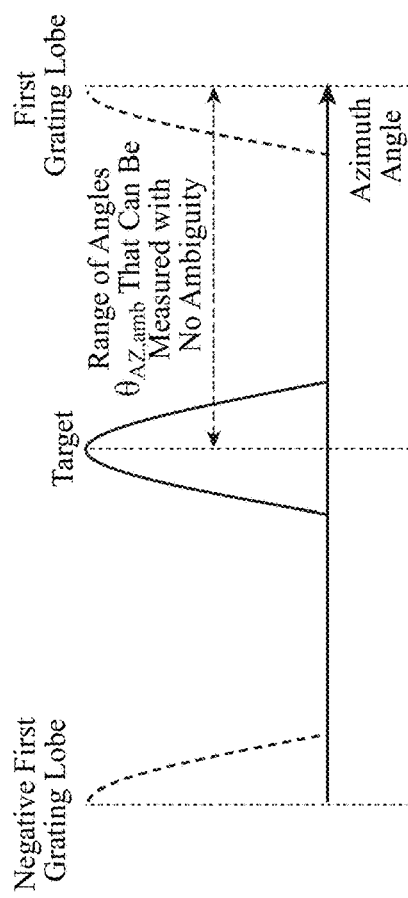
FIG. 23A is an explanatory diagram showing grating lobes that occur when a coherent integration unit 48 performs an FFT on a plurality of distance and speed signals $f_{b,1}(n_{Tx}, n_{Rx}, q_{ntgt}, k_{ntgt})$ when spacings between each two of transmission antennas 24-1 to 24-$N_{Tx}$ and between each two of reception antennas 31-1 to 31-$N_{Rx}$ are all identical.
Figure 23B:
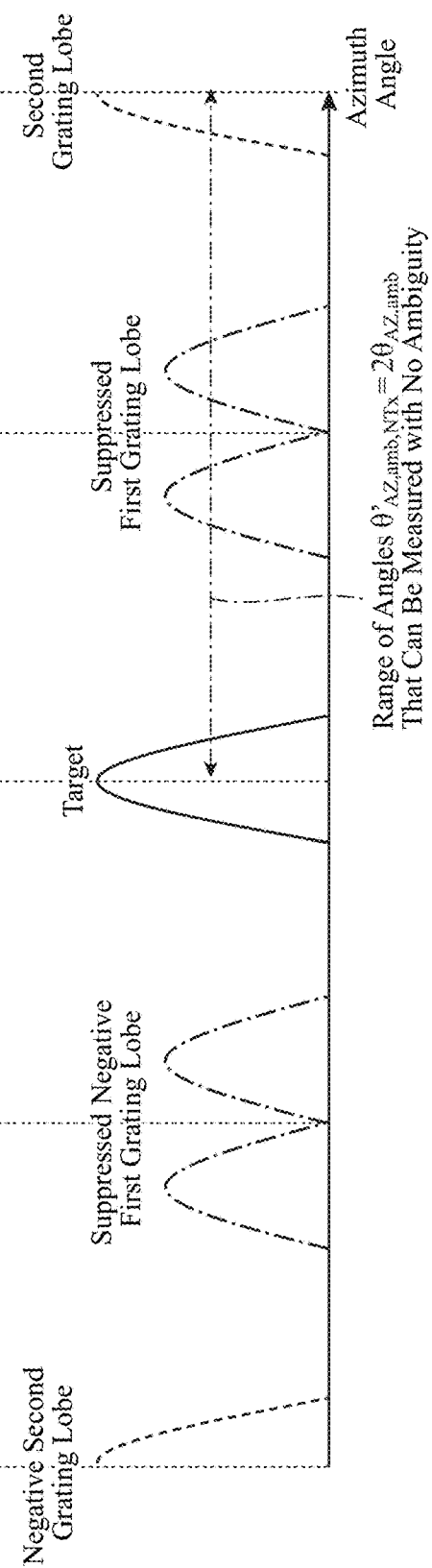
FIG. 23B is an explanatory diagram showing grating lobes that occur when the coherent integration unit 48 performs an FFT on a plurality of distance and speed signals $f'_{d,1}(n'_{TxRx}, q_{ntgt}, k_{ntgt})$ in a case of the antenna arrangement shown in FIG. 9.

By including the signal regular interval processing unit 47 and the coherent integration unit 48 in the signal processor 15, as shown in FIG. 23B, a first grating lobe is suppressed and the angle that can be measured with no ambiguity increases.

Specific description is as follows.

FIG. 23A is an explanatory diagram showing grating lobes that occur when the coherent integration unit 48 performs an FFT on a plurality of distance and speed signals $f_{b,1}(n_{Tx}, n_{Rx}, q_{ntgt}, k_{ntgt})$ when spacings between each two of the transmission antennas 24-1 to 24-$N_{Tx}$ and between each two of the reception antennas 31-1 to 31-$N_{Rx}$ are all identical.

FIG. 23B is an explanatory diagram showing grating lobes that occur when the coherent integration unit 48 performs an FFT on a plurality of distance and speed signals $f'_{d,1}(n'_{TxRx}, q_{ntgt}, k_{ntgt})$ in a case of the antenna arrangement shown in FIG. 9.

When the coherent integration unit 48 performs an FFT on a plurality of distance and speed signals $f_{b,1}(n_{Tx}, n_{Rx}, q_{ntgt}, k_{ntgt})$ when spacings between each two of the transmission antennas 24-1 to 24-$N_{Tx}$ and between each two of the reception antennas 31-1 to 31-$N_{Rx}$ are all identical, as shown in FIG. 23A, a first grating lobe occurs. By the occurrence of the first grating lobe, the angle that can be measured with no ambiguity is $\theta_{AZ, amb}$ as shown in FIG. 23A.

On the other hand, when the coherent integration unit 48 performs an FFT on a plurality of distance and speed signals $f'_{d,1}(n'_{TxRx}, q_{ntgt}, k_{ntgt})$ in a case of the antenna arrangement shown in FIG. 9, as shown in FIG. 23B, a first grating lobe is suppressed. By the suppression of the first grating lobe, the angle that can be measured with no ambiguity is $\theta'_{AZ, amb, NTX} = 2\theta_{AZ, amb}$ as shown in the following expression (34).

Thus, by including the signal regular interval processing unit 47 and the coherent integration unit 48 in the signal processor 15, the angle that can be measured with no ambiguity is increased over a case in which an FFT is performed on a plurality of distance and speed signals $f_{b,1}(n_{Tx}, n_{Rx}, q_{ntgt}, k_{ntgt})$ when the spacings between each two of the transmission antennas 24-1 to 24-$N_{Tx}$ and between each two of the reception antennas 31-1 to 31-$N_{Rx}$ are all identical.

$$\theta'_{AZ,sub,N_{Tx}} = \sin^{-1}\left(\frac{c}{f_0\Delta d_{N_{Tx}}}\right) = \sin^{-1}\left(\frac{c}{f_0\frac{d_R}{N_{Tx}}}\right) \quad (34)$$

The number of multiplications $N_{FFT,c}$ of an FFT performed by the coherent integration unit 48 shown in FIG. 20 is, as shown in the following expression (35), small compared to the number of multiplications $N_{DFT,c}$ of a discrete Fourier transform performed by the coherent integration unit 45 shown in FIG. 2.

$$N_{DFT,c} = N_{Tx}N_{Rx}N_{AZ} > N_{FFT,c} = \frac{N_{AZ,fft}}{2}\log_2 N_{AZ,fft} \quad (35)$$

Thus, the amount of computation performed by the coherent integration unit 48 shown in FIG. 20 decreases over the amount of computation performed by the coherent integration unit 45 shown in FIG. 2, as the number $N_{AZ}$ of assumed target azimuth angles increases.

In the signal processor 15 shown in FIG. 20, the coherent integration unit 48 coherently integrates a plurality of distance and speed signals $f'_{d,1}(n'_{TxRx}, q_{ntgt}, k_{ntgt})$ having been subjected to a signal regular interval process, by performing an FFT on the plurality of distance and speed signals $f'_{d,\,1}(n'_{TxRx},\,q_{ntgt},\,k_{ntgt})$ having been subjected to a signal regular interval process.

However, this is merely an example, and the coherent integration unit 48 may coherently integrate a plurality of distance and speed signals $f'_{d,\,1}(n'_{TxRx},\,q_{ntgt},\,k_{ntgt})$ having been subjected to a signal regular interval process, by performing a chirp z-transform (CZT) on the plurality of distance and speed signals $f'_{d,\,1}(n'_{TxRx},\,q_{ntgt},\,k_{ntgt})$ having been subjected to a signal regular interval process.

Specific description is as follows.

The coherent integration unit 48 performs, as shown in the following expression (36), a CZT on a plurality of distance and speed signals $f'_{d,\,1}(n'_{TxRx},\,q_{ntgt},\,k_{ntgt})$ having been subjected to a signal regular interval process, thereby generating a coherent-integration signal $R'_{Tx,\,Rx,\,ch}(n_{AZ},\,q_{ntgt},\,k_{ntgt})$ ranging from a minimum azimuth angle $\theta_{amb,\,min}$ to a maximum azimuth angle $\theta_{amb,\,max}$:

$$R'_{Tx,Rx,ch}(n_{AZ},q_{ntgt},k_{ntgt})=CZT[f'_{d,1}(n'_{TxRx},q_{ntgt},k_{ntgt}),\\ \theta_{amb,min},\theta_{amb,max},N_{AZ,czt}]$$

$(n_{tgt}=0,1,\ldots,N_{tgt}-1)$ $(n_{Rx}=0,1,\ldots,N_{Rx}-1)$ $(n_{Tx}=0,1,\ldots,N_{Tx}-1)$ $(n_{AZ}=0,1,\ldots,N_{AZ,czt}-1)$  (36)

CZT(X, $\theta_{amb,\,min}$, $\theta_{amb,\,max}$, $N_{AZ,\,czt}$) indicates a function that converts a signal ranging from the minimum azimuth angle $\theta_{amb,\,min}$ to the maximum azimuth angle $\theta_{amb,\,max}$ in a signal X into a coherent-integration signal that is sampled at an interval $\Delta\theta_{czt}$ represented by the following expression (37):

$$\Delta\theta_{czt} = \frac{(\theta_{amp,max} - \theta_{amp,min})}{N_{AZ,czt}} \quad (37)$$

In CZT shown in expression (36), a signal ranging from the minimum azimuth angle $\theta_{amb,\,min}$ to the maximum azimuth angle $\theta_{amb,\,max}$ is converted into a coherent-integration signal that is sampled at the interval $\Delta\theta_{czt}$. However, this is merely an example, and a signal in any angular range may be converted into a coherent-integration signal that is sampled at any interval, by changing the minimum azimuth angle $\theta_{amb,\,min}$ or the maximum azimuth angle $\theta_{amb,\,max}$ or changing the number of points $N_{AZ,\,czt}$.

The following expression (38) represents an angular interval Mm used by an FFT and an angular interval $\Delta\theta_{czt}$ used by a CZT:

$$\Delta\theta_{fft} > \Delta\theta_{czt} \quad (38)$$

Figures 24A, 24B:
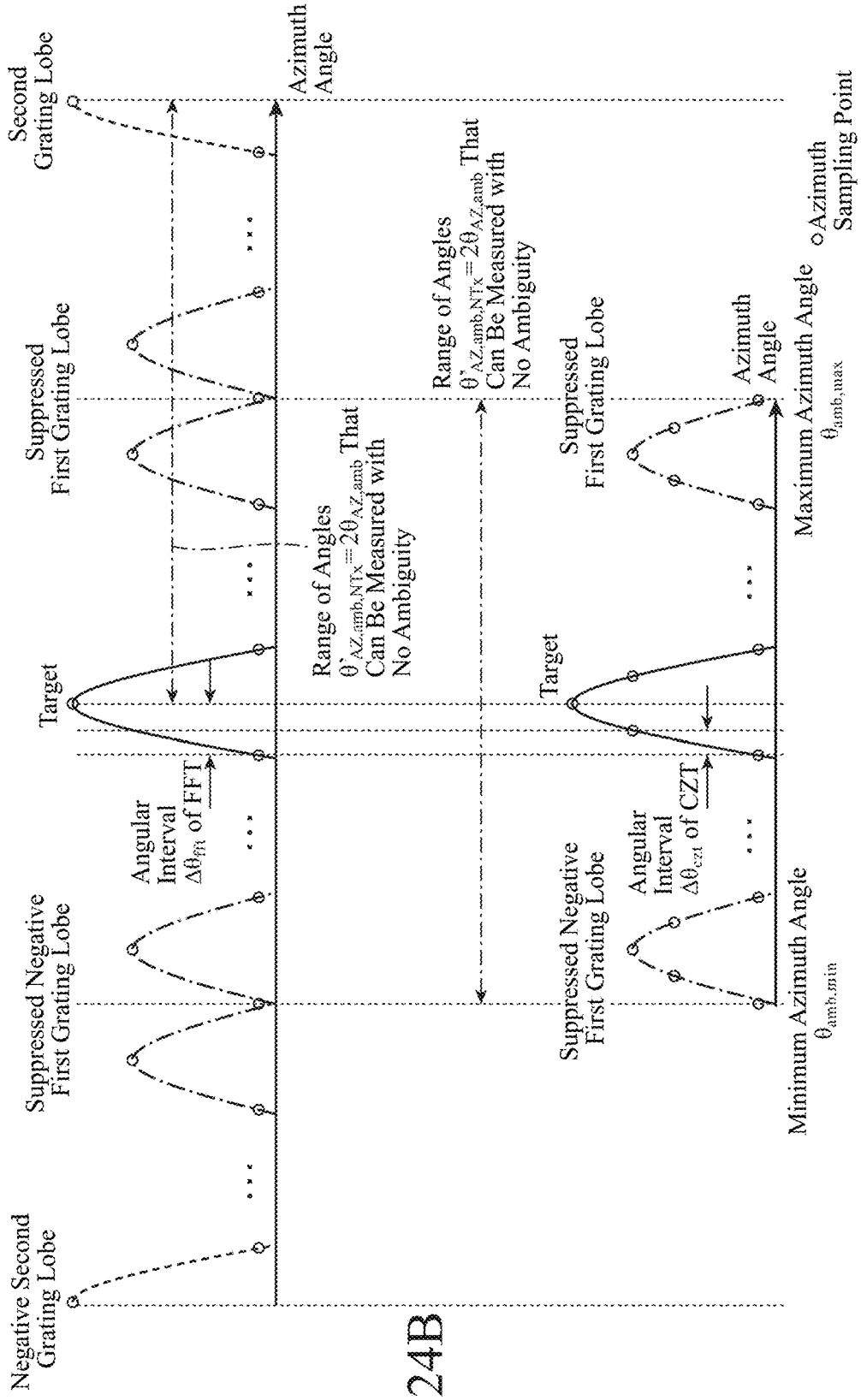
FIG. 24A is an explanatory diagram showing a coherent-integration signal obtained when the coherent integration unit 48 performs an FFT on a plurality of distance and speed signals $f_{d,1}$ in a case of the antenna arrangement shown in FIG. 9.
FIG. 24B is an explanatory diagram showing a coherent-integration signal obtained when the coherent integration unit 48 performs a CZT on a plurality of distance and speed signals $f_{d,1}$ in a case of the antenna arrangement shown in FIG. 9.

When the coherent integration unit 48 performs a CZT on a plurality of distance and speed signals $f'_{d,\,1}(n'_{TxRx},\,q_{ntgt},\,k_{ntgt})$ having been subjected to a signal regular interval process, as shown in FIG. 24B and expression (38), the coherent integration unit 48 can convert only a signal in a desired angular range.

Thus, the coherent integration unit 48 can perform high-rate sampling while reducing the amount of computation when a CZT is performed on a plurality of distance and speed signals $f'_{d,\,1}(n'_{TxRx},\,q_{ntgt},\,k_{ntgt})$ having been subjected to a signal regular interval process than when an FFT is performed.

FIG. 24A is an explanatory diagram showing a coherent-integration signal obtained when the coherent integration unit 48 performs an FFT on a plurality of distance and speed signals $f_{d,\,1}$ in a case of the antenna arrangement shown in FIG. 9.

FIG. 24B is an explanatory diagram showing a coherent-integration signal obtained when the coherent integration unit 48 performs a CZT on a plurality of distance and speed signals $f_{d,\,1}$ in a case of the antenna arrangement shown in FIG. 9.

Third Embodiment

In the radar device 1 shown in FIG. 1, the coherent integration unit 45 coherently integrates a distance and speed signal $f_{b,\,1}(n_{Tx},\,n_{Rx},\,q_{ntgt},\,k_{ntgt})$ outputted from the target candidate detecting unit 44, thereby obtaining a coherent-integration signal $R_{Tx,\,Rx,\,ch}(n_{EL},\,n_{AZ},\,q_{ntgt},\,k_{ntgt})$ such as that shown in expression (22).

In a third embodiment, a radar device 1 will be described in which the coherent integration unit 45 coherently integrates a distance and speed signal $f_{b,\,1}(n_{Tx},\,n_{Rx},\,q_{ntgt},\,k_{ntgt})$ by performing a super-resolution process on the distance and speed signal $f_{b,\,1}(n_{Tx},\,n_{Rx},\,q_{ntgt},\,k_{ntgt})$.

The configuration of the radar device 1 of the third embodiment is the same as the configuration of the radar device 1 of the first embodiment, and a configuration diagram showing the radar device 1 of the third embodiment is FIG. 1.

For the super-resolution process, a process such as multiple signal classification (MUSIC) or estimation of signal parameters via rotational invariance techniques (ESPRIT) can be used.

When the coherent integration unit 45 uses, for example, a MUSIC process as a super-resolution process, the coherent integration unit 45 coherently integrates a distance and speed signal $f_{b,\,1}(n_{Tx},\,n_{Rx},\,q_{ntgt},\,k_{ntgt})$ in accordance with the following expression (39).

$$R_{Tx,Rx,ch}(n_{EL}, n_{AZ}, q_{n_{tgt}}, k_{n_{tgt}}) = \\ \frac{a(\theta_{EL}(n_{EL}),\,\theta_{AZ}(n_{AZ}))^H a(\theta_{EL}(n_{EL}),\,\theta_{AZ}(n_{AZ}))}{a(\theta_{EL}(n_{EL}),\,\theta_{AZ}(n_{AZ}))^H E_N E_N^H a(\theta_{EL}(n_{EL}),\,\theta_{AZ}(n_{AZ}))}$$

$(n_{tgt} = 0, 1, \ldots, N_{tgt} - 1)$ $(n_{AZ} = 0, 1, \ldots, N_{AZ,fft} - 1)$ $(n_{EL} = 0, 1, \ldots, N_{EL,fft} - 1)$ In expression (39), $a(\theta_{EL}(n_{EL}),\,\theta_{AZ}(n_{AZ}))$ is a mode vector to be searched. H is the complex conjugate transpose and $E_N$ is the noise subspace.

MUSIC performs eigenvalue expansion on the basis of a relationship between an eigenvalue $\lambda_i$ and an eigenvector $W_i$ which is represented by the following expression (40):

$$R_{XX}W_i = \lambda_i W_i$$

$(i=0,1,\ldots,K-1)$  (40)

In expression (40), $R_{XX}$ is a correlation matrix represented by the following expression (41):

$$R_{XX}=XX^H \quad (41)$$

In expression (41), X is a distance and speed signal $f_{b,\,1}(n_{Tx},\,n_{Rx},\,q_{ntgt},\,k_{ntgt})$ corresponding to a target candidate which is detected to perform coherent integration, and K is the number of rows of the correlation matrix $R_{XX}$.

The coherent integration unit 45 performs eigenvalue expansion in accordance with expression (40), and calculates the number $N_E$ of eigenvalues that are not considered as noise subspace, on the basis of the size of K eigenvalues $\lambda_i$.

In addition, the coherent integration unit 45 calculates, as shown in the following expression (42), the wave number $N_{MU}$ of a target signal using the number $N_{Tx}$ of the transmission antennas, and calculates, as shown in the following expression (43), noise subspace $E_N$ used in expression (39):

$$N_{MU} = \frac{N_E}{N_{Tx}} \quad (42)$$

$$E_N = [w_{N_{MU}+1}, \ldots, w_K] \quad (43)$$

In the antenna arrangement shown in FIG. 9, as shown in FIG. 10, the spacing between the actual array antennas and the virtual array antennas differs from the spacing $d_{Rx}$ between each two of the reception antennas 31-1 to 31-4, and thus, the first grating lobe is suppressed. In addition, space different from noise subspace is generated by a multiple of the number $N_{Tx}$ of the transmission antennas of the number $N_{tgt}$ of targets.

Figures 25A, 25B:
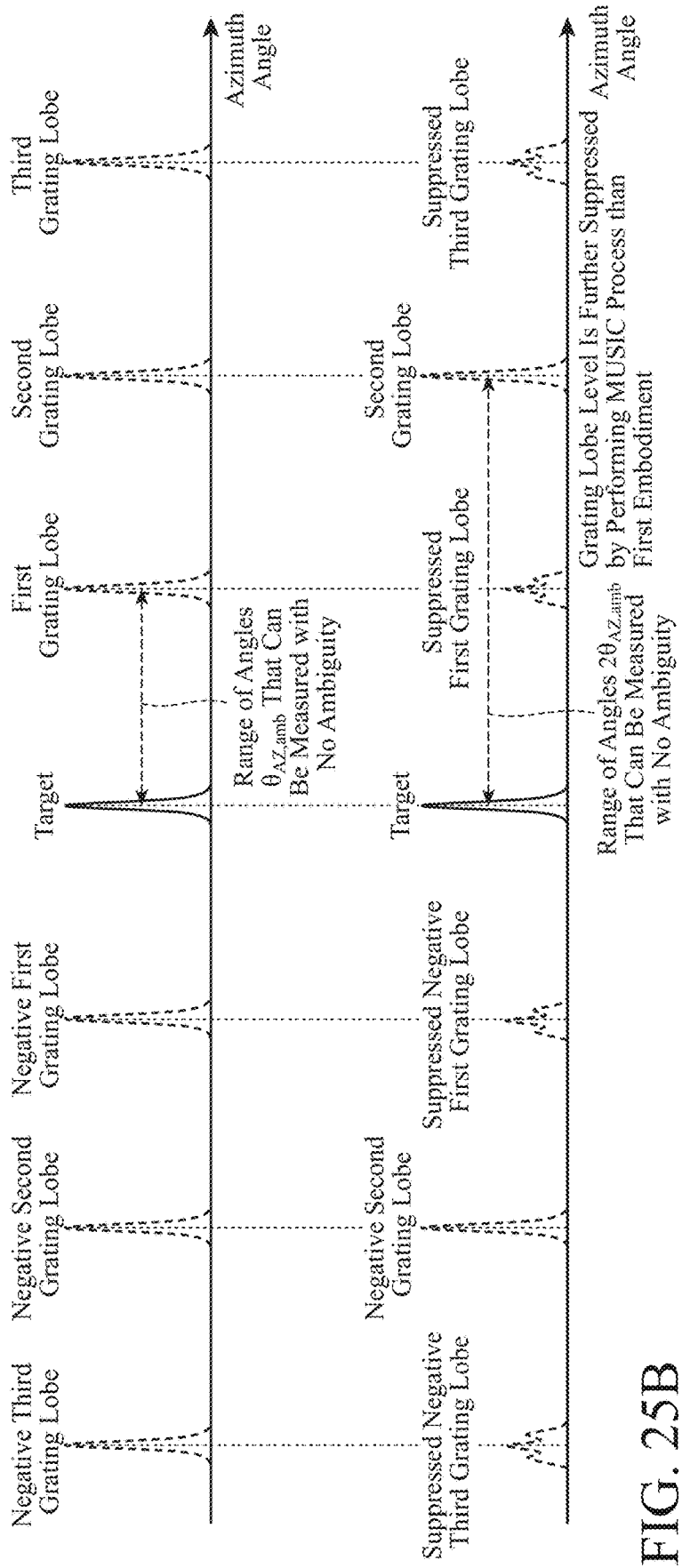
FIG. 25A is an explanatory diagram showing a coherent-integration signal obtained when virtual array antennas are formed when the transmission antennas 24-1 to 24-3 are arranged in the antenna arrangement shown in FIG. 18.
FIG. 25B is an explanatory diagram showing a coherent-integration signal obtained when a super-resolution process is performed on a distance and speed signal $f_{b,1}(n_{Tx}, n_{Rx}, q_{ntgt}, k_{ntgt})$ when the transmission antennas 24-1 to 24-3 are arranged in the antenna arrangement shown in FIG. 9.

The radar device 1 of the third embodiment can further suppress the grating lobe level as shown in FIG. 25B by generating noise subspace $E_N$ including grating lobes in accordance with expression (43).

FIG. 25A is an explanatory diagram showing a coherent-integration signal obtained when virtual array antennas are formed when the transmission antennas 24-1 to 24-3 are arranged in the antenna arrangement shown in FIG. 18.

FIG. 25B is an explanatory diagram showing a coherent-integration signal obtained when a super-resolution process is performed on a distance and speed signal $f_{b,1}(n_{Tx}, n_{Rx}, q_{ntgt}, k_{ntgt})$ when the transmission antennas 24-1 to 24-3 are arranged in the antenna arrangement shown in FIG. 15.

When the coherent integration unit 45 performs a super-resolution process on the distance and speed signal $f_{b,1}(n_{Tx}, n_{Rx}, q_{ntgt}, k_{ntgt})$, each of target separation performance and the performance of suppressing the grating lobe level can be enhanced over a case in which a discrete Fourier transform, etc., are performed.

The coherent integration unit 45 may perform correction spatial averaging of the correlation matrix $R_{XX}$ in accordance with the following expression (44):

$$R^{fb}_{XX} = \frac{R^f_{XX} + R^b_{XX}}{2} = \frac{R_{XX} + JR^*_{XX}J}{2} \quad (44)$$

In expression (44), $R^{fb}_{XX}$ is a correlation matrix obtained after the correction spatial averaging, $R^b_{XX}$ is a backward correlation matrix, * is the complex conjugate transpose, and J is represented as shown in the following expression (45):

$$J = \begin{bmatrix} 0 & \cdots & 0 & 1 \\ 0 & \cdots & 1 & 0 \\ \vdots & \ddots & \vdots & \vdots \\ 1 & \cdots & 0 & 0 \end{bmatrix} \quad (45)$$

Fourth Embodiments

In the radar devices 1 of the first to third embodiments, each of the transmission antennas 24-1 to 24-2 and the reception antennas 31-1 to 31-4 is installed, as shown in FIG. 26, in an area near an upper edge portion of a windshield's edge portion of the vehicle. FIG. 26 is an explanatory diagram showing exemplary installation of the transmission antennas 24-1 to 24-2 and the reception antennas 31-1 to 31-4 in the antenna device 2.

Figure 27:
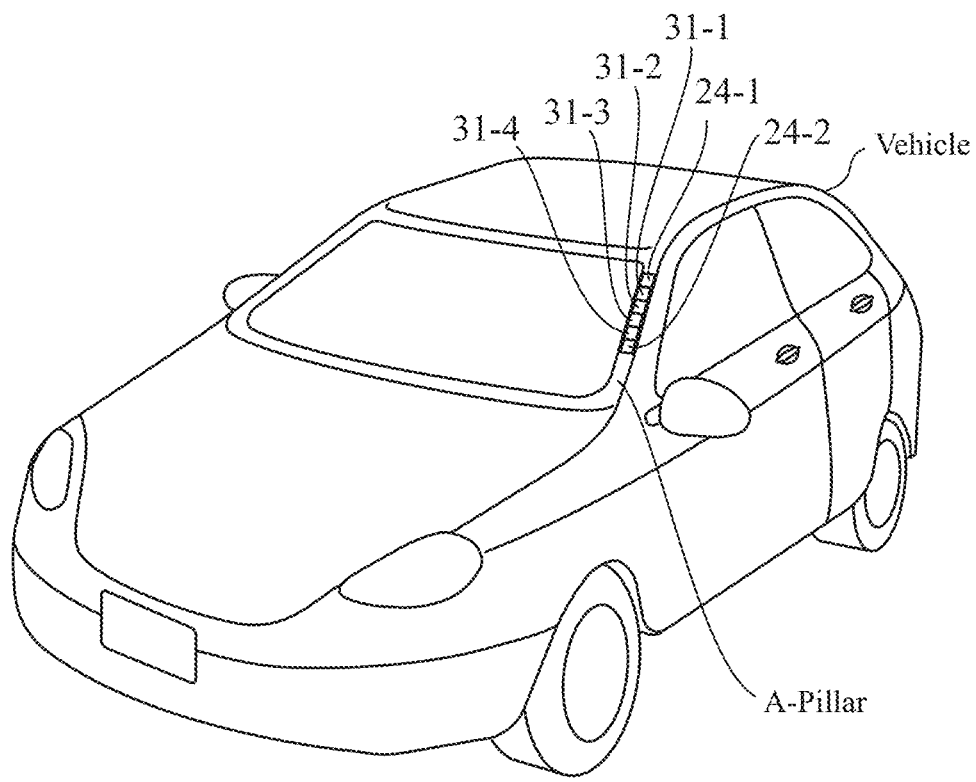
FIG. 27 is an explanatory diagram showing exemplary installation of the transmission antennas 24-1 to 24-2 and the reception antennas 31-1 to 31-4 in the antenna device 2.

However, this is merely an example, and each of the transmission antennas 24-1 to 24-2 and the reception antennas 31-1 to 31-4 may be installed on an A-pillar of the vehicle as shown in FIG. 27. In addition, each of the transmission antennas 24-1 to 24-2 and the reception antennas 31-1 to 31-4 may be installed, for example, on a B-pillar of the vehicle. FIG. 27 is an explanatory diagram showing exemplary installation of the transmission antennas 24-1 to 24-2 and the reception antennas 31-1 to 31-4 in the antenna device 2.

Note that when each of the transmission antennas 24-1 to 24-2 and the reception antennas 31-1 to 31-4 is installed on the A-pillar or B-pillar of the vehicle, a part or all of the A-pillar, etc., is provided with, for example, a member that allows transmission RF signals to pass therethrough, so that transmission RF signals radiated from the transmission antennas 24-1 to 24-2 are not blocked by the A-pillar, etc.

Figure 28:
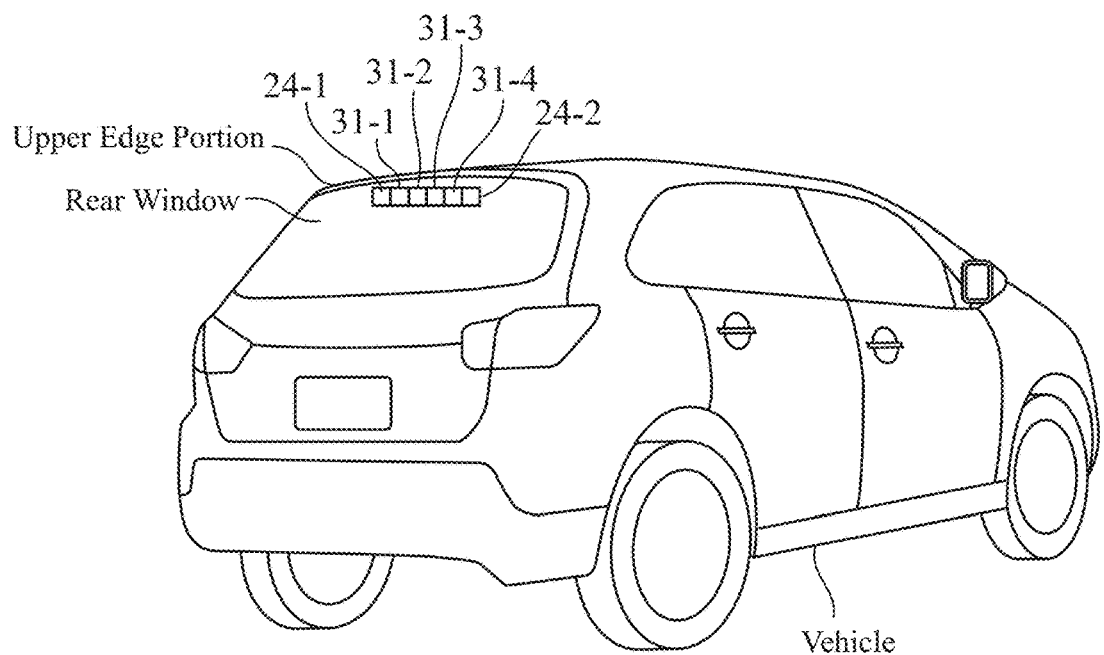
FIG. 28 is an explanatory diagram showing exemplary installation of the transmission antennas 24-1 to 24-2 and the reception antennas 31-1 to 31-4 in the antenna device 2.

In addition, each of the transmission antennas 24-1 to 24-2 and the reception antennas 31-1 to 31-4 may be installed, for example, as shown in FIG. 28, in an area near an upper edge portion of a rear window's edge portion. FIG. 28 is an explanatory diagram showing exemplary installation of the transmission antennas 24-1 to 24-2 and the reception antennas 31-1 to 31-4 in the antenna device 2.

Figure 29:
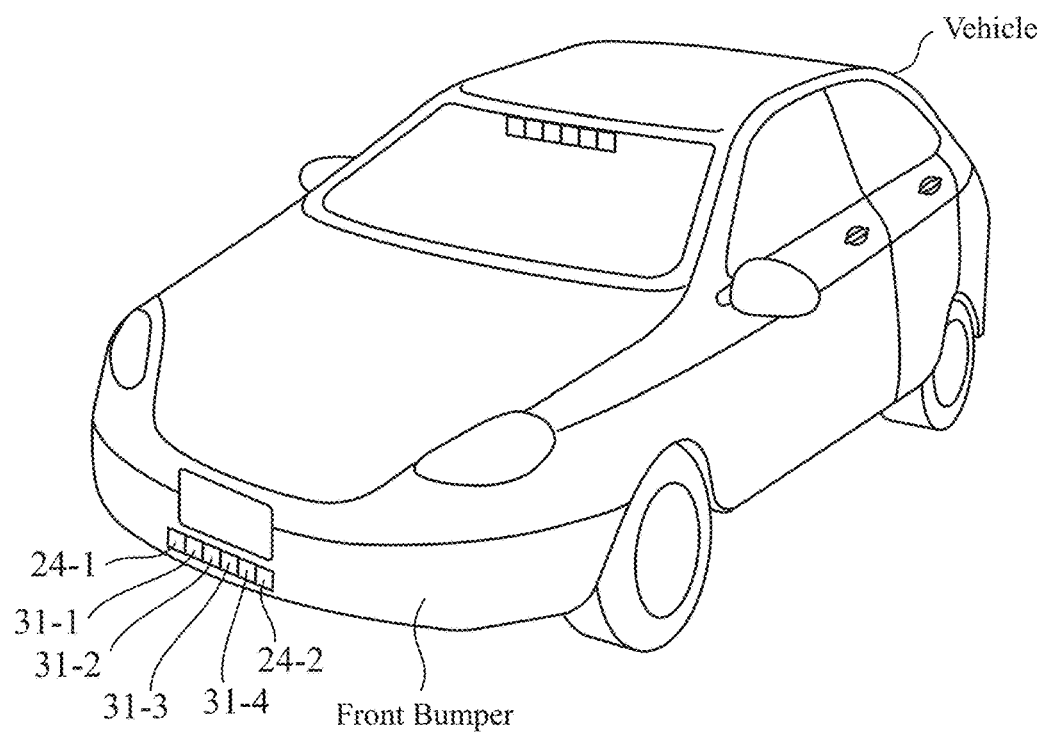
FIG. 29 is an explanatory diagram showing exemplary installation of the transmission antennas 24-1 to 24-2 and the reception antennas 31-1 to 31-4 in the antenna device 2.

In addition, each of the transmission antennas 24-1 to 24-2 and the reception antennas 31-1 to 31-4 may be installed, for example, as shown in FIG. 29, on the front bumper of the vehicle. FIG. 29 is an explanatory diagram showing exemplary installation of the transmission antennas 24-1 to 24-2 and the reception antennas 31-1 to 31-4 in the antenna device 2.

Figure 30:
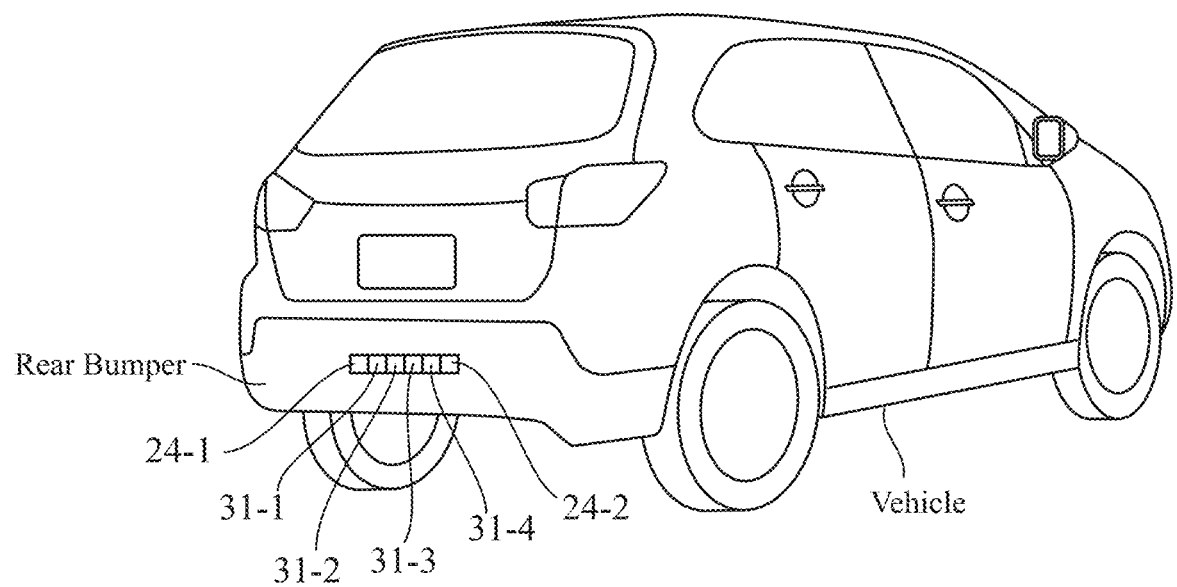
FIG. 30 is an explanatory diagram showing exemplary installation of the transmission antennas 24-1 to 24-2 and the reception antennas 31-1 to 31-4 in the antenna device 2.

In addition, each of the transmission antennas 24-1 to 24-2 and the reception antennas 31-1 to 31-4 may be installed, for example, as shown in FIG. 30, on the rear bumper of the vehicle. FIG. 30 is an explanatory diagram showing exemplary installation of the transmission antennas 24-1 to 24-2 and the reception antennas 31-1 to 31-4 in the antenna device 2.

Note that in the invention of the present application, a free combination of the embodiments, modifications to any component of each of the embodiments, or omissions of any component in each of the embodiments are possible within the scope of the invention.

INDUSTRIAL APPLICABILITY

The invention is suitable for an antenna device and a radar device that include a plurality of transmission antennas and a plurality of reception antennas.

REFERENCE SIGNS LIST

1: radar device, 2: antenna device, 11: transmitting unit, 12: receiving unit, 13: signal processor, 14: display unit, 15: signal processor, 20: modulating unit, 21: local oscillation signal generating unit, 22: code modulating unit, 23-1 to 23-$N_{Tx}$: transmitter, 24-1 to 24-$N_{Tx}$: transmission antenna, 24a-1 to 24a-$N_{Tx}$: radiation surface, 31-1 to 31-$N_{Rx}$: reception antenna, 32-1 to 32-$N_{Rx}$: receiver, 33-1 to 33-$N_{Rx}$: A/D converter, 41: separating unit, 42: signal generating unit, 43: incoherent integration unit, 44: target candidate detecting unit, 45: coherent integration unit, 46: angle calculating unit, 47: signal regular interval processing unit, 48: coherent integration unit, 51: separation circuit, 52: signal generating circuit, 53: incoherent integration circuit, 54: target candidate detection circuit, 55: coherent integration circuit, 56: angle calculation circuit, 57: signal regular interval processing circuit, 58: coherent integration circuit, 61: memory, and 62: processor.

The invention claimed is:

1. An antenna device comprising:
a plurality of transmission antennas to radiate transmission signals; and
a plurality of reception antennas each to receive, as a reflected signal, each of the transmission signals radiated from the respective plurality of transmission antennas and then reflected by a target, and output a reception signal corresponding to the reflected signals, wherein
the plurality of reception antennas are arranged at regular intervals between two transmission antennas adjacent to each other among the plurality of transmission antennas, and a length between the two transmission antennas has a width obtained by adding an integral multiple of a length between each two of the plurality of reception antennas to a width obtained by dividing the length between each two of the plurality of reception antennas by a number of the plurality of transmission antennas.

2. The antenna device according to claim 1, wherein spacings between each two of the plurality of transmission antennas differ from each other, and
each of the spacings between each two of the plurality of transmission antennas has a width obtained by adding an integral multiple of the length spacing between each two of the plurality of reception antennas to an integral multiple of the width obtained by dividing the length between each two of the plurality of reception antennas by the number of the plurality of transmission antennas.

3. The antenna device according to claim 1, wherein a length between a first transmission antenna included in the two transmission antennas and a reception antenna disposed so as to be adjacent to the first transmission antenna among the plurality of reception antennas is wider than the length between each two of the plurality of reception antennas, and a length between a second transmission antenna included in the two transmission antennas and a reception antenna disposed so as to be adjacent to the second transmission antenna among the plurality of reception antennas is wider than the length spacing between each two of the plurality of reception antennas.

4. The antenna device according to claim 1, wherein each of the plurality of transmission antennas and the plurality of reception antennas is installed on a vehicle.

5. The antenna device according to claim 4, wherein each of the plurality of transmission antennas and the plurality of reception antennas is installed on a windshield's edge portion of the vehicle, a rear window's edge portion of the vehicle, a pillar of the vehicle, a front bumper of the vehicle, or a rear bumper of the vehicle.

6. A radar device comprising:
a plurality of transmission antennas to radiate transmission signals;
a plurality of reception antennas each to receive, as a reflected signal, each of the transmission signals radiated from the respective plurality of transmission antennas and then reflected by a target, and output a reception signal corresponding to the reflected signals; and
a signal processor to coherently integrate the reception signals outputted from the plurality of reception antennas, on a basis of an arrangement of each of the plurality of transmission antennas and the plurality of reception antennas, and measure an angle of the target from a coherent-integration signal, the coherent-integration signal being a result of the coherent integration of the reception signals, wherein
the plurality of reception antennas are arranged at regular intervals between two transmission antennas adjacent to each other among the plurality of transmission antennas, and a length between the two transmission antennas has a width obtained by adding an integral multiple of a length between each two of the plurality of reception antennas to a width obtained by dividing the length between each two of the plurality of reception antennas by a number of the plurality of transmission antennas.

7. The radar device according to claim 6, wherein
spacings between each two of the plurality of transmission antennas differ from each other, and
each of the spacings between each two of the plurality of transmission antennas has a width obtained by adding an integral multiple of the length between each two of the plurality of reception antennas to an integral multiple of the width obtained by dividing the length between each two of the plurality of reception antennas by the number of the plurality of transmission antennas.

8. The radar device according to claim 6, wherein a length between a first transmission antenna included in the two transmission antennas and a reception antenna disposed so as to be adjacent to the first transmission antenna among the plurality of reception antennas is wider than the length between each two of the plurality of reception antennas, and a length between a second transmission antenna included in the two transmission antennas and a reception antenna disposed so as to be adjacent to the second transmission antenna among the plurality of reception antennas is wider than the length between each two of the plurality of reception antennas.

9. The radar device according to claim 6, wherein the signal processor calculates an azimuth angle of the target or an elevation angle of the target from the coherent-integration signal.

10. The radar device according to claim 6, wherein the signal processor generates a plurality of distance and speed signals including each of distance information about a distance to the target and speed information about a speed of the target, on a basis of the reception signals outputted from the plurality of reception antennas, coherently integrates the plurality of distance and speed signals on a basis of an arrangement of each of the plurality of transmission antennas and the plurality of reception antennas, and measures an angle of the target from a coherent-integration signal, the coherent-integration signal being a result of the coherent integration of the plurality of distance and speed signals.

11. The radar device according to claim 10, wherein the signal processor incoherently integrates the plurality of distance and speed signals, and calculates each of a distance to the target and a speed of the target from an incoherent-integration signal, the incoherent-integration signal being a result of the incoherent integration of the plurality of distance and speed signals.

12. The radar device according to claim 6, wherein the signal processor generates a plurality of distance and speed signals including each of distance information about a distance to the target and speed information about a speed of the target, on a basis of the reception signals outputted from the plurality of reception antennas, performs a signal regular interval process that converts the plurality of distance and speed signals into signals having regular signal intervals, performs a fast Fourier transform on the plurality of distance and speed signals having been subjected to the signal regular interval process, by which the plurality of distance and speed signals having been subjected to the signal regular interval process are coherently integrated, and measures an angle of the target from a coherent-integration signal, the coherent-integration signal being a result of the coherent integration of the plurality of distance and speed signals having been subjected to the signal regular interval process.

13. The radar device according to claim 6, wherein the signal processor generates a plurality of distance and speed signals including each of distance information about a distance to the target and speed information about a speed of the target, on a basis of the reception signals outputted from the plurality of reception antennas, performs a signal regular interval process that converts the plurality of distance and speed signals into signals having regular signal intervals, performs a chirp z-transform on the plurality of distance and speed signals having been subjected to the signal regular interval process, by which the plurality of distance and speed signals having been subjected to the signal regular interval process are coherently integrated, and measures an angle of the target from a coherent-integration signal, the coherent-integration signal being a result of the coherent integration of the plurality of distance and speed signals having been subjected to the signal regular interval process.

14. The radar device according to claim 6, wherein the signal processor generates a plurality of distance and speed signals including each of distance information about a distance to the target and speed information about a speed of the target, on a basis of the reception signals outputted from the plurality of reception antennas, performs a super-resolution process on the plurality of distance and speed signals, by which the plurality of distance and speed signals are coherently integrated, and measures an angle of the target from a coherent-integration signal, the coherent-integration signal being a result of the coherent integration of the plurality of distance and speed signals.

15. The radar device according to claim 14, wherein the signal processor performs correction spatial averaging of a correlation matrix used to perform the super-resolution process, and performs a super-resolution process on the plurality of distance and speed signals using the correlation matrix obtained after the correction spatial averaging.

16. The radar device according to claim 14, wherein the signal processor calculates a wave number used to perform the super-resolution process, on a basis of a number of the plurality of transmission antennas.

17. The radar device according to claim 6, comprising a modulator to modulate each local oscillation signal using a code corresponding to each of channel numbers of the respective plurality of transmission antennas, by which a plurality of transmission signals are generated, and output each of the plurality of transmission signals to a corresponding one of the plurality of transmission antennas.

18. The radar device according to claim 6, wherein each of the plurality of transmission antennas and the plurality of reception antennas is installed on a vehicle.

19. The radar device according to claim 18, wherein each of the plurality of transmission antennas and the plurality of reception antennas is installed on a windshield's edge portion of the vehicle, a rear window's edge portion of the vehicle, a pillar of the vehicle, a front bumper of the vehicle, or a rear bumper of the vehicle.

* * * * *